(12) United States Patent  (10) Patent No.: US 7,133,215 B2
Otake                      (45) Date of Patent: Nov. 7, 2006

(54) VARIFOCAL ZOOM LENS AND CAMERA SYSTEM

(75) Inventor: Motoyuki Otake, Saitama (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 11/144,841

(22) Filed: Jun. 6, 2005

(65) Prior Publication Data
US 2005/0275951 A1    Dec. 15, 2005

(30) Foreign Application Priority Data
Jun. 10, 2004   (JP) .......................... P2004-172916

(51) Int. Cl.
*G02B 15/14* (2006.01)
(52) U.S. Cl. .................. 359/689; 359/557; 359/680; 359/681; 359/682; 359/683; 359/716; 359/740; 359/784; 359/753
(58) Field of Classification Search ............ 359/557, 359/680–683, 689, 716, 740, 784, 753
See application file for complete search history.

(56) References Cited

U.S. PATENT DOCUMENTS

| | | | |
|---|---|---|---|
| 5,559,635 A | | 9/1996 | Sato et al. |
| 6,417,973 B1 | * | 7/2002 | Mihara et al. ............... 359/689 |
| 6,538,824 B1 | * | 3/2003 | Mihara et al. ............... 359/689 |
| 6,844,986 B1 | * | 1/2005 | Nanba ......................... 359/689 |

(Continued)

FOREIGN PATENT DOCUMENTS

EP    1 093 000    4/2001

(Continued)

OTHER PUBLICATIONS

Partial EPO Search Report mailed Oct. 27, 2005.

(Continued)

*Primary Examiner*—Evelyn A. Lester
(74) *Attorney, Agent, or Firm*—Rader, Fishman & Grauer PLLC; Ronald P. Kananen

(57) ABSTRACT

A varifocal zoom lens includes: a first lens group having a negative refractive power; a second lens group having a positive refractive power, including a cemented lens component L21 formed by combining a positive lens having a convex surface on the object side and a negative lens having a concave surface on an image side and a positive lens component L22 disposed on the image side with respect to the cemented lens component L21, spaced from the cemented lens component L21 by an air space and having a convex surface on the object side and disposed behind the first lens group with respect to an object side; and a third lens group having a positive refractive power and disposed behind the second lens group with respect to the object side. At least the first and the second lens group are moved and the second lens group is moved toward the object side so as to decrease an interval between the first and the second lens group, when a lens state is changed from a shortest-focal-length lens state to a longest-focal-length lens state, an aperture stop is disposed between the first and the second lens group, and the second lens group includes and satisfies conditions expressed by:

$$0.02 < D_s/(R22_a - R21_b) < 0.1 \qquad (1)$$

$$0.6 < D_a/R21_b < 0.8 \qquad (2)$$

where $D_s$ is the length of an air space between the cemented lens component L21 and the positive lens component L22, $R22_a$ is the radius of curvature of the surface on the object side of the positive lens component L22, $R21_b$ is the radius of curvature of the surface on the image side of the cemented lens component L21, and $D_a$ is the distance between the

G1: FIRST LENS GROUP
G2: SECOND LENS GROUP
G3: THIRD LENS GROUP aperture stop and the surface on the image side of the cemented lens component L21.

17 Claims, 20 Drawing Sheets

U.S. PATENT DOCUMENTS 6,943,962 B1 * 9/2005 Sekita ........................ 359/689
2003/0189762 A1 10/2003 Mihara et al

FOREIGN PATENT DOCUMENTS

| EP | 1093000 A | 4/2001 |
|----|-----------|--------|
| JP | 2003-066332 | 3/2003 |
| JP | 2003-140041 | 5/2003 |
| JP | 2003-140047 | 5/2003 |
| JP | 2003-149555 | 5/2003 |

OTHER PUBLICATIONS

EPO Search Report mailed Feb. 10, 2006.

* cited by examiner

G1: FIRST LENS GROUP
G2: SECOND LENS GROUP
G3: THIRD LENS GROUP

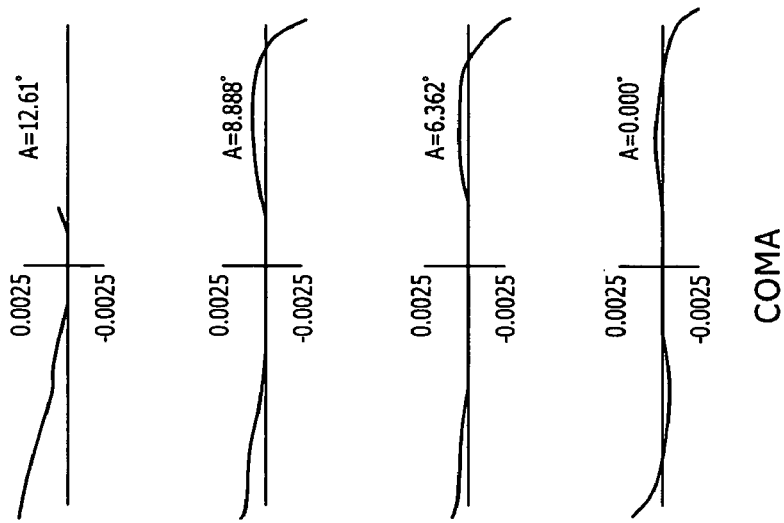
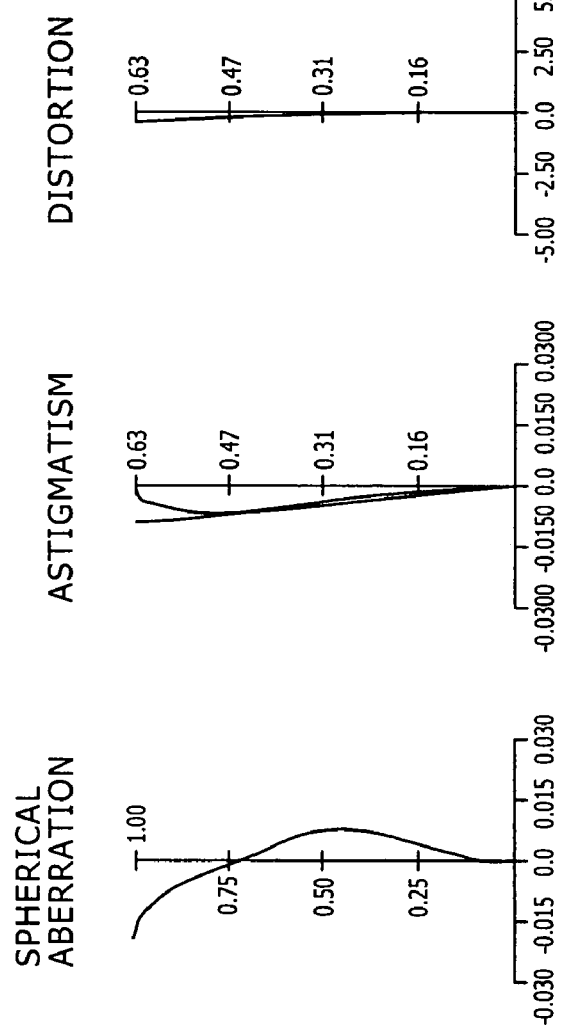
FIG. 9

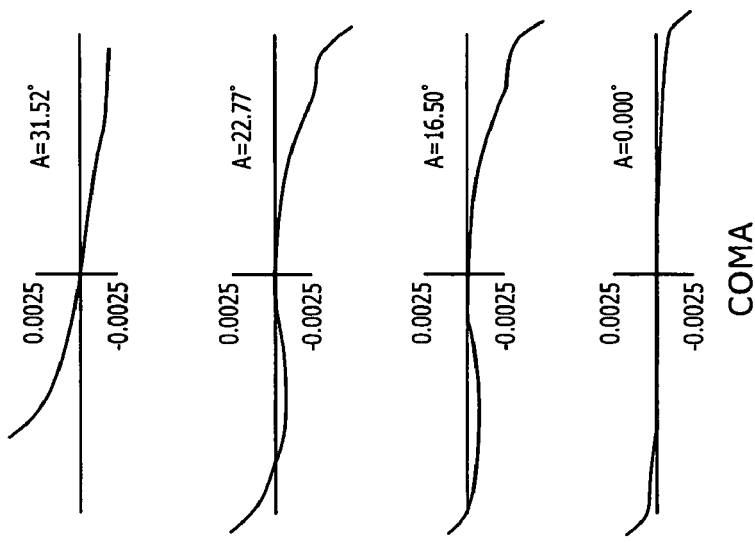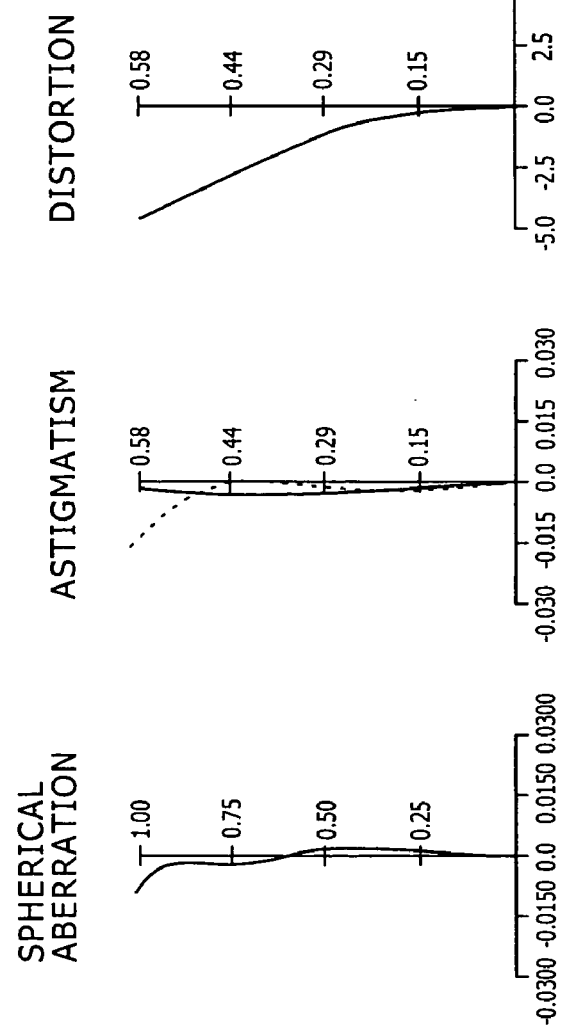
FIG. 15

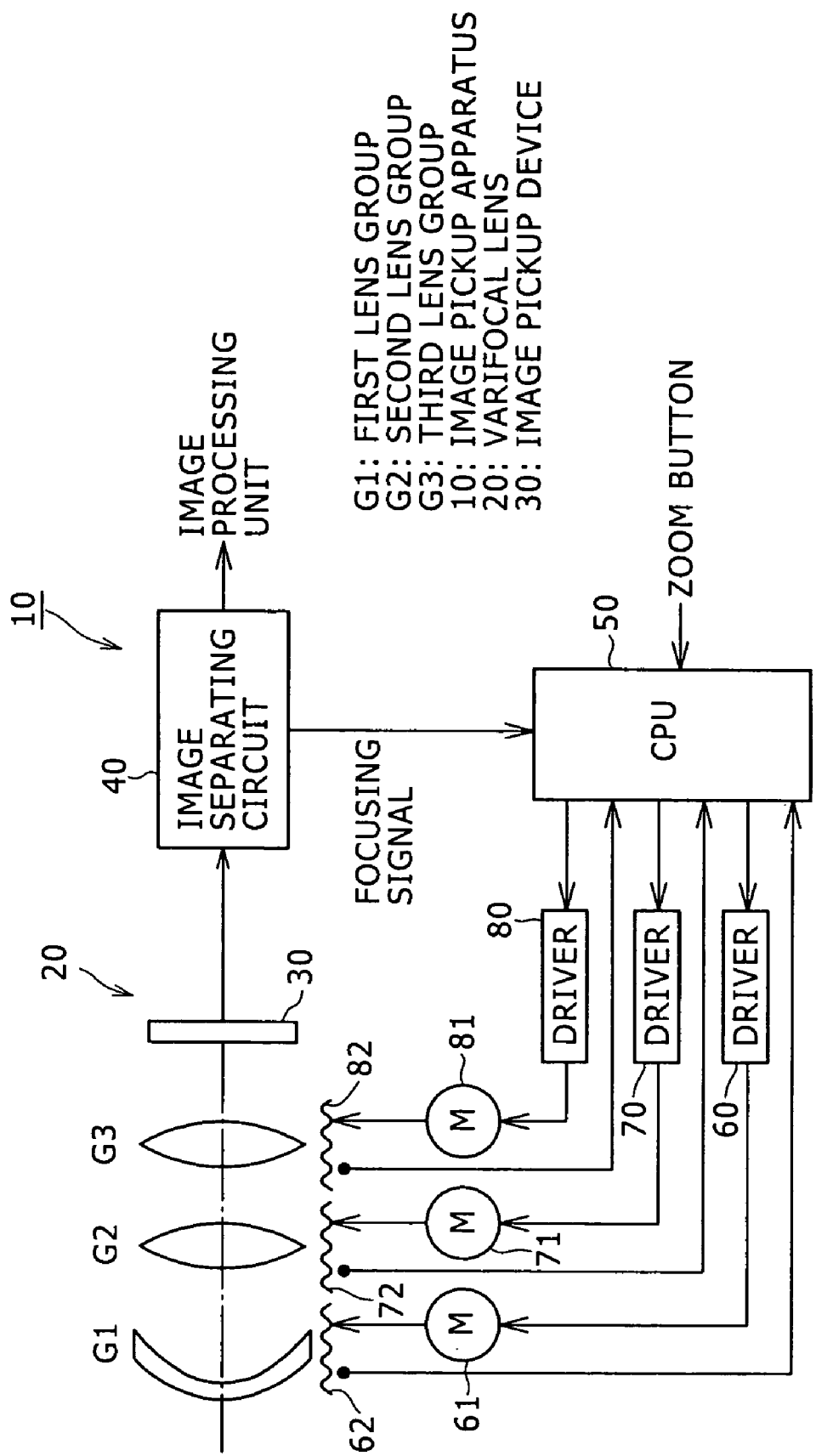

VARIFOCAL ZOOM LENS AND CAMERA SYSTEM

CROSS REFERENCES TO RELATED APPLICATIONS

The present invention contains subject matter related to Japanese Patent Application JP2004-172916 filed in the Japanese Patent Office on Jun. 10, 2004, the entire contents of which are incorporated herein by reference.

BACKGROUND OF THE INVENTION

1. Field of the Invention

The present invention relates to a varifocal zoom lens and a camera system. More specifically, the present invention relates to a varifocal zoom lens including a plurality of movable lens groups for changing focal length, particularly, a varifocal zoom lens suitable for use on a camera system provided with a solid-state imaging device, such as a video camera or a digital still camera, and to a camera system provided with the varifocal zoom lens.

2. Description of the Related Art

A known recording method of recording an image of an object records the image of the object by converting the quantity of light forming the image formed on the surface of a camera system using, as a recording means for a camera, a photoelectric converter, such as a CCD (charge-coupled device) or a CMOS (complementary metal-oxide semiconductor), into electric signals by the photoelectric converter.

The operating speed of central processing units (CPUs) has been increased and the degree of integration of storage mediums has been increased with the recent advancement of fine-processing techniques. Consequently, high-speed processing of image data of a large capacity, which had been difficult, has been realized. The scale of integration of light-receiving devices has been increased and the miniaturization of light-receiving devices has advanced. The increase in the scale of integration made recording at higher spatial frequencies possible, and the miniaturization of the light-receiving device brought about the miniaturization of cameras.

The increase in the scale of integration and miniaturization of the light-receiving device reduced the light-receiving area of each photoelectric conversion element. Consequently, the magnitude of an electric output provided by each photoelectric conversion element is reduced, and hence the effect of noise has become serious. An attempt made to prevent the adverse effect of noise placed a small lens unit, namely, a microlens array, right in front of photoelectric conversion elements to increase the quantity of light falling on the light-receiving elements by increasing the aperture ratio of the optical system. The microlens array placed restrictions on the position of the exit pupil of the lens system instead of guiding light rays falling on boundaries between the adjacent elements onto the elements. When the exit pupil of the lens system approaches the light receiving elements, i.e., when an angle between the principal ray falling on the light-receiving element and the optical axis increases, off-axis light rays falling on a peripheral part of an image surface are inclined at large angles to the optical axis and, consequently, the off-axis light rays are unable to fall on the light-receiving elements and an insufficient quantity of light falls on the light receiving elements.

Whereas a camera provided with a photoelectric converter as a light-receiving device, namely, a digital still camera, does not need any developing operation and facilitates data handling, such as the confirmation of an image formed by the camera, the image quality of the image is inferior to that of an image formed on a 35 mm film format camera using a 35mm film as a recording medium, and the camera needs to be connected to equipment, such as a computer. Thus the number of digital still cameras in use has not increased. Digital still cameras have become generally used in recent years owing to the improvement of image quality and the diffusion of equipment.

Both an increase in the scale of integration of the light-receiving device and an improvement of the performance of the optical system are important for the improvement of image quality.

An increased zoom ratio increases the user's degree of freedom of phototaking. For example, an increase zoom ratio enables phototaking at a short object distance and phototakingg scenery in a wide range in a room at a short object distance.

A known practical zoom lens is the so-called negative-negative-positive three-group lens including, for example, a first lens group having a negative refractive power, a second lens group having a positive refractive power and a third lens group having a positive refractive power arranged from the side of the object in that order.

Zoom lenses are mentioned in Patent documents 1, 2, 3 and 4.

The zoom lens mentioned in Patent document 1 employs an Ernostar type lens formed by combining four lenses, namely, convex, convex, concave and convex lenses, as a second lens group. The zoom lens mentioned in Patent document 2 employs an Ernostar type lens formed by combining a second lens group including three lenses, namely, convex, convex and concave lenses, and a third lens group. The zoom lens mentioned in Patent document 3 employs a triplet type lens formed by combining three lenses, namely, convex, concave and convex lenses, as a second lens group. The zoom lens in a fifth embodiment according to the invention disclosed in Patent document 4 has a second lens group including a convex/concave cemented lens and a convex lens.

The light-receiving device has been miniaturized through the increase of the scale of integration in recent years, and it has been desired to achieve both the miniaturization of the lens system and the improvement of the performance of the lens system. It has been desired to suppress the deterioration of the performance of the lens system due to the decentration of the component lenses caused during the manufacturing process.

Patent document 1: JP-A 2003-66332
Patent document 2: JP-A 2003-140041
Patent document 3: JP-A 2003-140047
Patent document 4: JP-A 2003-149555

SUMMARY OF THE INVENTION

Use of lenses respectively having small diameters to miniaturize the lens system increases the degrees of decentration of the lenses. The high refractive powers of the lenses enhance the sensitivity to decentration which deteriorates the performance of the lens system.

The first lens group expands axial light rays, and the expanded axial light rays fall on the second lens group. Therefore, it is desirable that the second lens group has a large aperture ratio. Since the incident height (height at objectwise lens surface) of the off-axis light rays does not change and the incident angle of the off-axis light rays changes with lens state, it is desirable to suppress satisfactorily the variation of off-axial aberration resulting from the change of lens state and to suppress the deterioration of the performance attributable to the second lens group as effectively as possible.

The second lens group of each of the zoom lenses disclosed in Patent documents 1 and 2 has a convex lens and a cemented lens formed by combining a convex lens and a concave lens. In a lens chamber, a spacer may be interposed between the convex lens and the cemented lens. If spacers for large lenses and those for small lenses are formed with the same machining accuracy, smaller lenses are tilted more greatly by the same machining error in the thickness of the spacer.

The three lenses of the second lens group of the zoom lens disclosed in Patent document 3 touch each other. Therefore, it is difficult to stabilize performance deterioration due to the accumulation of the respective degrees of decentration of the lenses caused during manufacture.

The zoom lens in the fifth embodiment according to the invention disclosed in Patent document 4 is not sufficiently miniaturized because the second lens group of this zoom lens has two blocks.

Accordingly, it is desired to solve the foregoing problems and to provide a varifocal zoom lens not greatly susceptible to assembling errors that occur during manufacture and having a stable optical quality and a camera system provided with the varifocal zoom lens.

A preferred embodiment of the present invention resides in a varifocal zoom lens including: a first lens group having a negative refractive power; a second lens group having a positive refractive power, including a cemented lens component L21 formed by combining a positive lens having a convex surface on the object side and a negative lens having a concave surface on an image side and a positive lens component L22 disposed on the image side with respect to the cemented lens component L21, spaced from the cemented lens component L21 by an air space and having a convex surface on the object side and disposed behind the first lens group with respect to an object side; and a third lens group having a positive refractive power and disposed behind the second lens group with respect to the object side; wherein at least the first and the second lens group are moved and the second lens group is moved toward the object side so as to decrease an interval between the first and the second lens group, when a lens state is changed from a shortest-focal-length lens state for the largest field angle to a longest-focal-length lens state for the smallest field angle, an aperture stop is disposed between the first and the second lens group, and the second lens group includes and satisfies conditions expressed by:

$$0.02 < D_s/(R22_a - R21_b) < 0.1 \tag{1}$$

$$0.6 < D_a/R21_b < 0.8 \tag{2}$$

where $D_s$ is the length of an air space between the cemented lens component L21 and the positive lens component L22, $R22_a$ is the radius of curvature of the surface on the object side of the positive lens component L22, $R21_b$ is the radius of curvature of the surface on the image side of the cemented lens component L21, and $D_a$ is the distance between the aperture stop and the surface on the image side of the cemented lens component L21.

A preferred embodiment of the present invention resides in a camera system including: a varifocal zoom lens including: a first lens group having a negative refractive power; a second lens group having a positive refractive power, including a cemented lens component L21 formed by combining a positive lens having a convex surface on the object side and a negative lens having a concave surface on an image side and a positive lens component L22 disposed on the image side with respect to the cemented lens component L21, spaced from the cemented lens component L21 by an air space and having a convex surface on the object side and disposed behind the first lens group with respect to an object side; and a third lens group having a positive refractive power and disposed behind the second lens group with respect to the object side; and an image pickup device; wherein at least the first and the second lens group are moved and the second lens group is moved toward the object side so as to decrease an interval between the first and the second lens group, when a lens state is changed from a shortest-focal-length lens state for the largest field angle to a longest-focal-length lens state for the smallest field angle, an aperture stop is disposed between the first and the second lens group, and the second lens group includes and satisfies conditions expressed by:

$$0.02 < D_s/(R22_a - R21_b) < 0.1 \tag{1}$$

$$0.6 < D_a/R21_b < 0.8 \tag{2}$$

where $D_s$ is the length of an air space between the cemented lens component L21 and the positive lens component L22, $R22_a$ is the radius of curvature of the surface on the object side of the positive lens component L22, $R21_b$ is the radius of curvature of the surface on the image side of the cemented lens component L21, and $D_a$ is the distance between the aperture stop and the surface on the image side of the cemented lens component L21.

Thus the present invention corrects aberrations satisfactorily, and the cemented lens component L21 and the positive lens component L22 can be brought into contact with each other outside the effective diameter of the lens.

A varifocal zoom lens in a preferred embodiment according to the present invention includes: a first lens group having a negative refractive power; a second lens group having a positive refractive power and disposed behind the first lens group with respect to an object side; and a third lens group having a positive refractive power and disposed behind the second lens group with respect to the object side; wherein at least the first and the second lens group are moved to change a lens state from a shortest-focal-length lens state for the largest field angle to a longest-focal-length lens state for the smallest field angle, the second lens group is moved toward the object side so as to decrease an interval between the first and the second lens group, an aperture stop is disposed between the first and the second lens group, the second lens group includes a cemented lens component L21 formed by combining a positive lens having a convex surface on the object side and a negative lens having a concave surface on an image side and a positive lens component L22 disposed on an image side with respect to the cemented lens component L21, spaced from the cemented lens component L21 and having a convex surface on the object side and satisfies conditions expressed by:

$$0.02 < D_s/(R22_a - R21_b) < 0.1 \tag{1}$$

$$0.6 < D_a/R21_b < 0.8 \tag{2}$$

where $D_s$ is the length of the air space between the cemented lens component L21 and the positive lens component L22, $R22_a$ is the radius of curvature of the surface on the object side of the positive lens component L22, $R21_b$ is the radius of curvature of the surface on the image side of the cemented lens component L21, and $D_a$ is the distance between the aperture stop and the surface on the image side of the cemented lens component L21.

A camera system in a preferred embodiment according to the present invention includes: a varifocal zoom lens including a first lens group having a negative refractive power, a second lens group having a positive refractive power and disposed behind the first lens group with respect to an object side, and a third lens group having a positive refractive power and disposed behind the second lens group with respect to the object side, wherein at least the first and the second lens group are moved to change a lens state from a shortest-focal-length lens state for the largest field angle to a longest-focal-length lens state for the smallest field angle, the second lens group is moved toward the object side so as to decrease an interval between the first and the second lens group; and an image pickup device; wherein an aperture stop is disposed between the first and the second lens group, and the second lens group includes a cemented lens component L21 formed by combining a positive lens having a convex surface on the object side and a negative lens having a concave surface on an image side and a positive lens component L22 disposed on an image side with respect to the cemented lens component L21, spaced from the cemented lens component L21 and having a convex surface on the object side, and satisfies conditions expressed by:

$$0.02 < D_s/(R22_a - R21_b) < 0.1 \quad (1)$$

$$0.6 < D_d/R21_b < 0.8 \quad (2)$$

where $D_s$ is the length of the air space between the cemented lens component L21 and the positive lens component L22, $R22_a$ is the radius of curvature of the surface on the object side of the positive lens component L22, $R21_b$ is the radius of curvature of the surface on the image side of the cemented lens component L21, and $D_a$ is the distance between the aperture stop and the surface on the image side of the cemented lens component L21.

According to the embodiment of the present invention, the deterioration of performance of the varifocal zoom lens due to the decentration of the lenses caused during manufacture can be suppressed, and the varifocal zoom lens can be formed in a small size and has improved performance.

Preferably, the varifocal zoom lens according to the embodiment of the present invention satisfies a condition expressed by:

$$1.8 < |f_1|/f_w < 2.3 \quad (3)$$

where $f_1$ is the focal length of the first lens group, and $f_w$ is the focal length of the varifocal zoom lens in the shortest-focal-length lens state.

The varifocal zoom lens satisfying Expression (3) has a short total length, can properly correct axial aberration and off-axial aberration, and can satisfactorily correct the variation of coma with field angle.

Preferably, the varifocal zoom lens according to the embodiment of the present invention satisfies a condition expressed by either of the expressions:

$$-0.3 < (R22_a + R22_b)/(R22_a - R22_b) < 0.2 \quad (4)$$

$$1.6 < f_2/f_w < 2.1 \quad (5)$$

where $R22_b$ is the radius of curvature of the surface on the image side of the positive lens component L22, and $f_2$ is the focal length of the second lens group.

Thus, the varifocal zoom lens according to the embodiment of the present invention can satisfactorily correct the variation of coma with field angle in the shortest-focal-length lens state and the variation of axial aberration with the variation of field angle by satisfying the condition expressed by Expression (4), and prevent the increase of lens diameter and can satisfactorily correct the variation of axial aberration with the variation of field angle by satisfying the condition expressed by Expression (5).

The variation of coma and that of axial aberration with the variation of field angle in a shortest-focal-length lens state can be more satisfactorily corrected and an increase in lens diameter can be avoided when the varifocal zoom lens according to the embodiment of the present invention satisfies both Expressions (4) and (5).

Preferably, the varifocal zoom lens according to the embodiment of the present invention satisfies at least either of conditions expressed by expressions:

$$\Sigma 2/f_w < 0.85 \quad (6)$$

$$TL_w/f_w < 6.5 \quad (7)$$

where $\Sigma 2$ is the thickness of the second lens group and $TL_w$ is the length of the varifocal zoom lens in a shortest-focal-length lens state.

Thickness increase of the second lens group can be avoided when either of the conditions expressed by Expressions (6) and (7) is met. Length increase of the total length of the varifocal zoom lens can be avoided when the condition expressed by Expression (7) is met. Thus the varifocal zoom lens can be further miniaturized.

BRIEF DESCRIPTION OF THE DRAWINGS

The above and other objects, features and advantages of the present invention will become apparent from the following description taken in connection with the accompanying drawings, in which:

FIG. 9 is diagrams showing spherical aberration, astigmatism, distortion and coma caused by the varifocal zoom lens in the numerical example 2 of the second embodiment in a longest-focal-length lens state;

FIG. 15 is diagrams showing spherical aberration, astigmatism, distortion and coma caused by a varifocal zoom lens in a numerical example 4 of the fourth embodiment in a shortest-focal-length lens state;

FIG. 18 is a block diagram of a camera system embodying the present invention;

DESCRIPTION OF THE PREFERRED EMBODIMENTS

Figure 1:
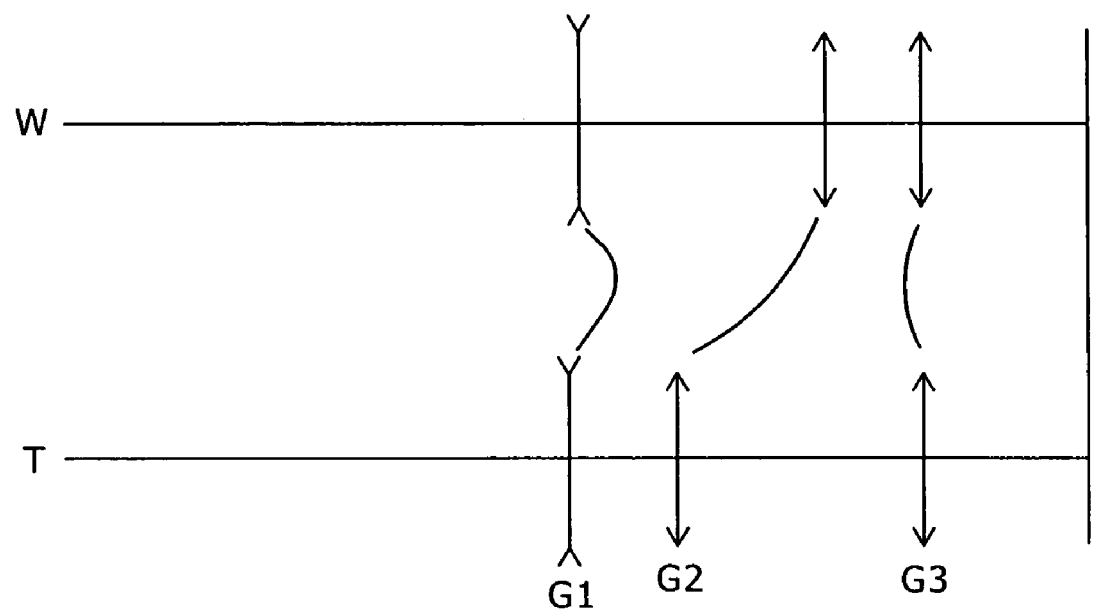
FIG. 1 is a diagrammatic view of assistance in explaining the distribution of refractive power of each of the lens groups included in a varifocal zoom lens according to an embodiment of the present invention.

A varifocal zoom lens in preferred embodiments according to the present invention and a camera system embodying the present invention will be described with reference to the accompanying drawings.

A varifocal zoom lens according to the embodiment of the present invention includes a first lens group having a negative refractive power, a second lens group having a positive refractive power and disposed behind the first lens group with respect to an object side, and a third lens group having a positive refractive power and disposed behind the second lens group with respect to the object side. At least the first and the second lens groups are moved to change the lens state from a shortest-focal-length lens state for the largest field angle to a longest-focal-length lens state for the smallest field angle, and the second lens group is moved toward an object side so as to decrease an interval between the first and the second lens group. An aperture stop is disposed between the first and the second lens group.

When the lens state is changed from the shortest-focal-length lens state to the longest-focal-length lens state, the variation of off-axial aberration resulting from the variation of lens state is suppressed satisfactorily by taking advantage of the approach of off-axis light rays to the optical axis of the varifocal zoom lens.

The second lens group of the varifocal zoom lens includes a cemented lens L21 and a positive lens L22 disposed on an image side with respect to the cemented lens L21 and spaced from the cemented lens L21. The second lens group is formed in the so-called peripheral-contact structure in which the cemented lens L21 and the positive lens L22 touch each other outside the effective lens diameter. Thus, decentration of the component lenses of the second lens group and decentration caused by manufacturing work can be suppressed, and hence the varifocal zoom lens has a stable optical property.

The shape of the cemented lens L21 of the second lens group is designed so as to form the varifocal zoom lens system in a small size.

Employment of lens groups respectively having high refractive powers is effective in miniaturizing a lens system. However, when lens groups respectively having high refractive powers are employed, the decentration of lenses caused during manufacture exerts a considerably significant effect on the deterioration of the performance of the lens system.

Since the front convex surface, on the object side, of the cemented lens component L21 of the second lens group faces the aperture stop, off-axis light rays are caused to diverge greatly and are liable to cause off-axial aberration. The radius of curvature of the front convex surface of the cemented lens component L21 are determined properly to suppress the deterioration of the performance due to the decentration of the lenses and to achieve the miniaturization of the lens system.

The varifocal zoom lens of the present invention satisfies conditions expressed by:

$$0.02 < D_s/(R22_a - R21_b) < 0.1 \quad (1)$$

$$0.6 < D_a/R21_b < 0.8 \quad (2)$$

where $D_s$ is the length of the air space between the cemented lens component L21 and the positive lens component L22, $R22_a$ is the radius of curvature of the surface on the object side of the positive lens component L22, $R21_b$ is the radius of curvature of the surface on the image side of the cemented lens component L21, and $D_a$ is the distance between the aperture stop and the surface on the image side of the cemented lens component L21.

The conditions expressed by Expressions (1) and (2) specify the shape of the air space in the second lens group.

In the varifocal zoom lens of the present invention, it is important to determine properly the length of the air space in the second lens group, and the respective radii of curvature of the surface on the image side of the cemented lens component L21 and the surface on the object side of the positive lens L22 such that the cemented lens component L21 of the second lens group and the positive lens component L22 of the second lens group disposed behind the cemented lens component L21 and spaced from the cemented lens component L21 are in direct touch with each other on the outside of the effective lens diameter when the cemented lens component L21 and the positive lens element L22 are disposed in a lens chamber without placing any spacer between the cemented lens component L21 and the positive lens component L22.

If $D_s/(R22_a - R21_b)$ in Expression (1) is not smaller than 0.1, it is difficult to restrict the shift of the positive lens component L22 in a direction perpendicular to the optical axis relative the cemented lens component L21 because the center distance between spheres respectively containing the surface on the object side of the positive lens L22 and the surface on the image side of the cemented lens component L21 is long. Consequently, it is difficult to suppress decentration caused during manufacture with reliability.

If the length of the air space between the cemented lens component L21 and the positive lens component L22 is long, the cemented lens component L21 and the positive lens component L22 are able to touch each other only at a position greatly spaced apart from the optical axis and the lens diameter increases undesirably.

The varifocal zoom lens of the present invention causes a higher spherical aberration by using the air space between the cemented lens component L21 and the positive lens component L22 disposed on the image side with respect to the cemented lens component L21 and separated by the air space from the cemented lens component L21. If the upper limit specified by Expression (1) is 0.07 or below higher, spherical aberration can be satisfactorily caused for the further enhancement of the performance of the varifocal zoom lens.

A value of $D_s/(R22_a-R21_b)$ below the lower limit specified by Expression (1) is not desirable because negative distortion is extremely large in the shortest-focal-length lens state and it is difficult for the varifocal zoom lens system to exercise a predetermined optical performance due to a small higher spherical aberration caused by the air space between the cemented lens component L21 and the positive lens component L22 if $D_s/(R22_a-R21_b)$ is below the lower limit specified by Expression (1)

Expression (2) specifies the radii of curvature of the surfaces of the cemented lens component L21 of the second lens group.

The refractive power arrangement in the varifocal zoom lens system is extremely asymmetrical in the shortest-focal-length lens state if the first and the second lens group are spaced a long distance apart from each other. Therefore, the second lens group needs a lens having a concave surface facing the image side to cause positive distortion by the second lens group.

Therefore, it is desirable that the cemented lens component L21 of the second lens group of the varifocal zoom lens of the present invention have a concave surface of a small radius of curvature on the image side.

The incident angle of off-axis light rays falling on the surface on the image side of the cemented lens L21 relates with positive distortion. Therefore, Expression (2) specifies a numerical range for a value, namely, the ratio of distance between the aperture stop and the surface on the image side of the cemented lens component L21 to the radius of curvature of the same surface, namely, $D_d/R21_b$, for satisfactorily correcting negative distortion.

If the ratio $D_d/R21_b$ is below the lower limit specified by Expression (2), negative distortion caused in the shortest-focal-length lens state cannot be satisfactorily corrected. If the ratio $D_d/R21_b$ is above the upper limit specified by Expression (2), intensive coma due to decentration is caused by slight decentration in a peripheral part of an image surface in the shortest-focal-length lens state. Thus decentration caused during manufacture makes it hardly possible to stabilize a predetermined optical performance.

The second lens group of the varifocal zoom lens of the present invention satisfying the conditions expressed by Expressions (1) and (2) has a simple construction, and the varifocal zoom lens can be sufficiently miniaturized.

Preferably, the varifocal zoom lens according to the embodiment of the present invention satisfies a condition expressed by:

$$1.8 < |f_1|/f_w < 2.3 \quad (3)$$

where $f_1$ is the focal length of the first lens group, and $f_w$ is the focal length of the varifocal zoom lens in the shortest-focal-length lens state. Expression (3) specifies the focal length of the first lens group.

If the ratio $|f_1|/f_w$ is above the upper limit specified by Expression (3), the varifocal zoom lens has a long length in the longest-focal-length lens state. If the ratio $|f_1|/f_w$ is below the lower limit specified by Expression (3), off-axis light rays incident on the first lens group in the longest-focal-length lens state are close to the optical axis. Consequently, the individual correction of axial aberration and off-axial aberration is difficult and the variation of coma with the variation of field angle cannot be satisfactorily corrected.

Preferably, the varifocal zoom lens according to the embodiment of the present invention satisfies, to achieve both miniaturization and performance enhancement in a well balanced mode, a condition expressed by either of expressions:

$$-0.3 < (R22_a+R22_b)/(R22_a-R22_b) < 0.2 \quad (4)$$

$$1.6 < f_2/f_w < 2.1 \quad (5)$$

where $R22_b$ is the radius of curvature of the surface on the image side of the positive lens component L22, and $f_2$ is the focal length of the second lens group.

Figure 19A:
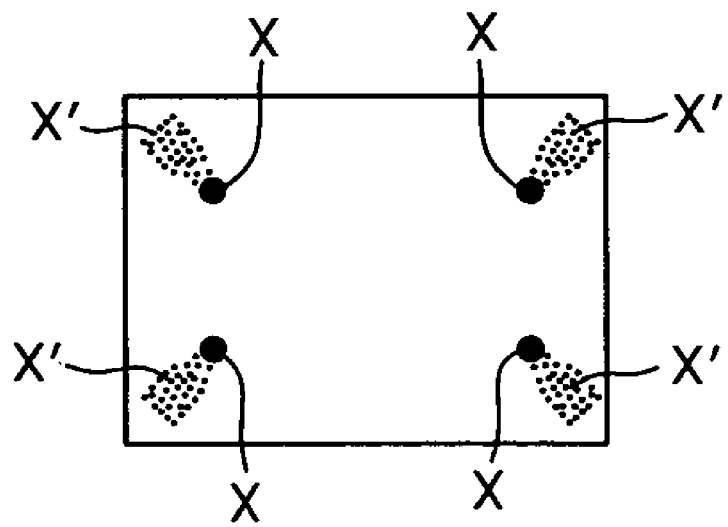
FIGS. 19A and 19B are diagrammatic views of assistance in explaining outward coma.
Figure 19B:
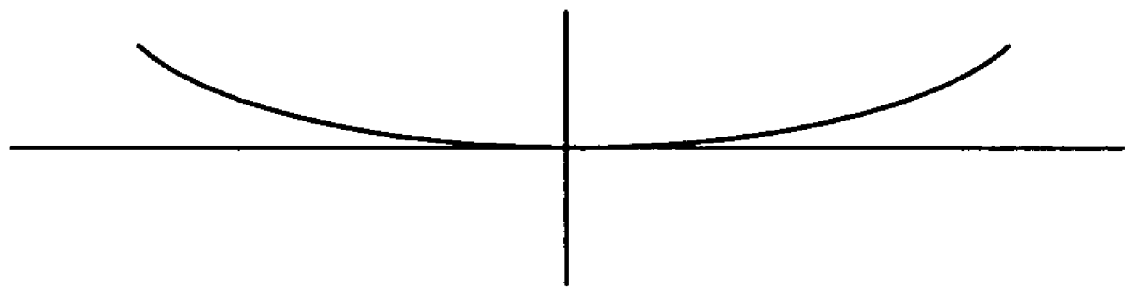
Figure 20A:
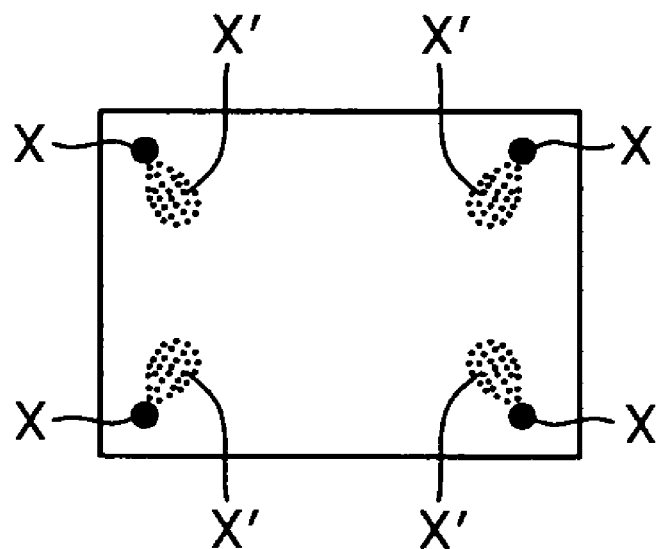
FIGS. 20A and 20B are diagrammatic views of assistance in explaining inward coma.
Figure 20B:
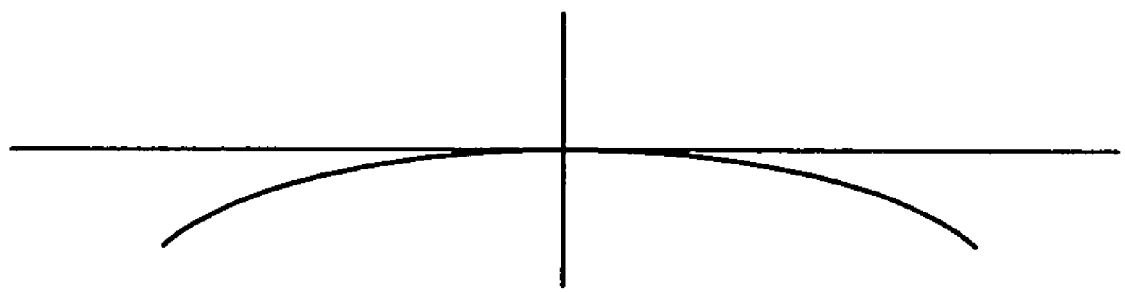

Expression (4) specifies the shape of the positive lens included in the second lens group. If the ratio $(R22_a+R22_b)/(R22_a-R22_b)$ is above the upper limit specified by Expression (4), outward coma is liable to arise and the variation of coma with the variation of field angle in the shortest-focal-length lens state cannot be satisfactorily corrected. Outward coma is an image defect that forms a fuzzy image resembling the fuzzy tail of a comet and extending outward from a spot. Outward coma is, for example, an aberration that forms a fuzzy image x' extending outward from a spot x and making the spot x look like a comet as shown in FIG. 19A. Inward coma is, for example, an aberration that forms a fuzzy image x' extending inward from a spot x and making the spot x look like a comet as shown in FIG. 20A. FIG. 20B is a coma diagram showing the inward coma. If the ratio $(R22_a+R22_b)/(R22_a-R22_b)$ is below the lower limit specified by Expression (4), the air space between the cemented lens component L21 and the positive lens component L22 of the second lens group narrows when the cemented lens L21 and the positive lens L22 touch each other outside the effective lens diameter. Consequently, it is difficult to correct satisfactorily negative spherical aberration caused by the second lens group, and the variation of axial aberration with the variation of lens state (field angle) cannot be satisfactorily corrected.

Expression (5) specifies the focal length of the second lens group. If the ratio $f_2/f_2$ is above the upper limit specified by Expression (5), the axial distance between the first and the second lens group increases in the shortest-focal-length lens state. Consequently, off-axis light rays passing through the first lens group deviate from the optical axis and the lens diameter increases. If the ratio $f_2/f_2$ is below the lower limit specified by Expression (5), correction of negative spherical aberration caused by the second lens group is difficult. When the varifocal zoom lens according to the embodiment of the present invention satisfies both Expressions (4) and (5), the varifocal zoom lens exercises high performance.

The varifocal zoom lens of the present invention can be further miniaturized when the varifocal zoom lens of the present invention satisfies conditions expressed by expressions:

$$\Sigma 2/f_w < 0.85 \quad (6)$$

$$TL_w/f_w < 6.5 \quad (7)$$

where $\Sigma 2$ is the thickness of the second lens group and $TL_w$ is the length of the varifocal zoom lens in a shortest-focal-length lens state.

Expression (6) specifies the lens thickness of the second lens group. Generally, the thickness of the body of a collapsible mount type camera that collapses a lens barrel and houses the collapsed lens barrel in the body increases undesirably with the increase of the respective thicknesses of the lens groups.

If $f_w$ is above the upper limit specified by Expression (6), the second lens group has a big thickness and the body of the camera is undesirably thick.

Expression (7) specifies the total length of the varifocal zoom lens in the shortest-focal-length lens state. The total length of the varifocal zoom lens system of the present invention in the shortest-focal-length lens state is liable to increase. If the total length of the varifocal zoom lens collapsed to house the varifocal zoom lens in the body of the camera for carrying is long, the body of the camera is inevitably large.

If $TL_w/f_w$ is above the lower limit specified by Expression (7), the total length in the shortest-focal-length lens state is long and the body of the camera is undesirably thick.

When the lens state in the varifocal zoom lens of the present invention is changed from the shortest-focal-length lens state to the longest-focal-length lens state, the position of an image of an object at an infinite distance formed by the varifocal zoom lens is not continuously fixed.

The varifocal zoom lens of the present invention may be combined with a detecting system for detecting change in the position of an image, a focusing system including a lens moving system for moving some of the lens components of the varifocal zoom lens along the optical axis, and a control system that determines values of manipulated variables of the driving system necessary for compensating the position of an image on the basis of output provided by the detecting system to form a lens system.

Naturally, the varifocal zoom lens can be a zoom lens in which the lens components thereof are moved with respect to each other to obtain a continuously variable focal length while the image is kept in the same image plane.

When the varifocal zoom lens of the present invention is focused on an object at a short distance, it is desirable that one of the lens groups moves or one of the lens components of one of the lens groups moves. It is preferable to move the third lens group because the variation of off-axis aberration due to the variation of the position of the object is small when the third lens group is moved. The position of the third lens group is fixed with respect to an image plane regardless of the lens state in the preferred embodiments to be described below, and the third lens group may be disposed at different positions respectively for the shortest-focal-length lens state and the middle-focal-length lens state.

The varifocal zoom lens of the present invention may employ an aspherical lens to achieve higher optical performance. Further improvement of central performance, i.e., better correction of spherical aberration, can be achieved by using a lens having an aspherical surface facing the object as the lens nearest to the object of the second lens group. The variation of coma resulting from the variation of field angle in the shortest-focal-length lens state can be satisfactorily corrected by using an aspherical lens as one of the first lens group.

It goes without saying that the optical performance of an optical system can be improved by providing the optical system with a plurality of aspherical surfaces.

An image can be shifted by shifting one of the lens groups or one of the lens components of one of the lens groups of the varifocal zoom lens of the present invention in a direction substantially perpendicular to the optical axis. An antivibration optical system can be built by combining the varifocal zoom lens with a camera-shake detecting system, a driving system for shifting the lens groups, and a control system that determines values of manipulated variables of the driving system necessary for compensating the position of an image on the basis of output provided by the detecting system.

An image can be shifted with a little variation of aberration by shifting the second lens group or the lens component of the second lens group in a direction substantially perpendicular to the optical axis. Since the second lens group is disposed near the aperture stop, the variation of coma due to the shift of the second lens group or the lens component of the second lens group is little because off-axis light rays pass near the optical axis.

Naturally, a low-pass filter may be disposed on the image side of the lens system to prevent the formation of moiré or an infrared cut filter may be disposed on the image side of the lens system as the spectral sensitivity characteristic of the light-receiving device needs.

Varifocal zoom lenses in preferred embodiments will be described hereinafter.

Aspherical surfaces in the preferred embodiments are defined by:

$$x = cy^2/[1+\{1-(1+\kappa)c^2y^2\}^{1/2}] + C_4 y^4 + C_6 y^6 + \ldots$$

where y is the height from the optical axis, x is sag, c is the curvature, $\kappa$ is the conic coefficient and $C_4$, $C_6$ are aspherical coefficients.

FIG. 1 shows the distribution of refractive power of a varifocal zoom lens in each of the preferred embodiments according to the present invention. A first lens group having a negative refractive power, a second lens group G2 having a positive refractive power and a third lens group G3 having a positive refractive power are arranged in that order from the object side, namely, the front side, toward the image side, namely, the back side. When the lens state of the varifocal zoom lens is changed from a shortest-focal-length lens state to a longest-focal-length lens state, the second lens group G2 is moved toward the object side, the first lens group G1 is moved toward the object side after temporarily moving the first lens group G1 toward the image side and the third lens group G3 is kept stationary with respect to the optical axis so that the length of an air space between the first lens group G1 and the second lens group G2 increases and the length of an air space between the second lens group G2 and the third lens group G3 changes. The varifocal zoom lens in each of the preferred embodiments is provided with a protective glass plate in front of the first lens group.

Figure 2:
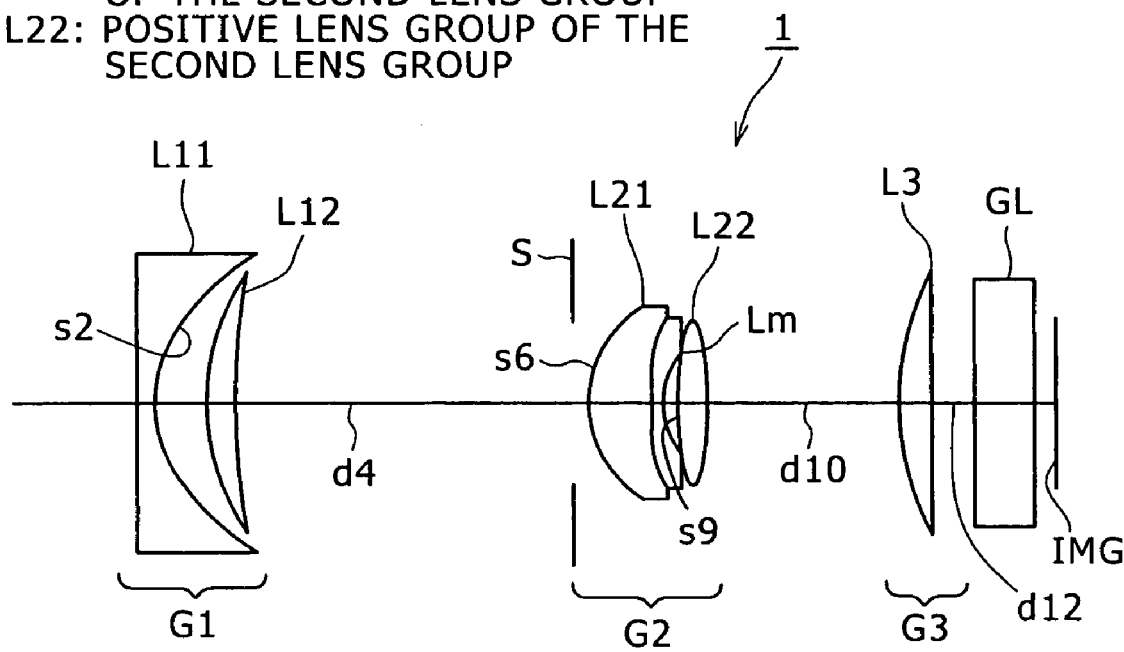
FIG. 2 is a diagrammatic view of a varifocal zoom lens in a first embodiment according to the present invention.

FIG. 2 shows a varifocal zoom lens 1 in a first embodiment according to the present invention. A first lens group G1 includes a negative lens component L11 having a concave surface facing the image side and a positive lens component L12 having a convex surface facing the object side. A second lens group G2 includes a cemented lens component L21 including a positive lens having a convex surface facing the object side and a negative lens having a concave surface facing the image side and a biconvex positive lens component L22. A third lens group G3 has a positive lens component L3. A contact edge Lm is formed in a surface on the image side of the cemented lens component L21 of the second lens group G2 in a circular area near and outside a circle of the effective diameter of the cemented lens component L21. A surface $s_9$ on the object side of the positive lens component L22 is in contact with the contact edge Lm. Thus the second lens group G2 has the so-called peripheral-contact construction.

In the varifocal zoom lens 1 in the first embodiment, an aperture stop S is disposed in front of the second group G2. The aperture stop S moves together with the second lens group G2 when the lens state of the varifocal zoom lens 1 is changed.

Table 1 shows numerical values of dimensions of a varifocal zoom lens in a numerical example 1 of the varifocal zoom lens in the first embodiment. In Table 1, "$s_i$" indicates the i-th surface from the front, "$r_i$" indicates the radius of curvature of the i-th surface, "$d_i$" indicates the distance between the i-th surface and the i+1-th surface, "$n_i$" indicates the refractive index of the i-th material to the D line ($\lambda$=587.6 nm), and "$v_i$" indicates the Abbe's number of the i-th material to the D line ($\lambda$=587.6 nm). In Table 1, "INFINITY" indicates that the relevant surface is flat and "ASP" indicates that the relevant surface is an aspherical surface.

a longest-focal-length lens state, respectively, F numbers and field angles $2\omega°$ for focal lengths.

TABLE 2

| | Focal length | | |
|---|---|---|---|
| | 1.000 | 1.581 | 3.296 |
| F number | 2.88 | 3.75 | 5.69 |
| 2ω (°) | 63.02 | 41.34 | 20.12 |
| d4 | 2.454 | 1.326 | 0.315 |
| d10 | 1.363 | 2.060 | 4.118 |
| d12 | 0.279 | 0.279 | 0.279 |
| Back focus | 0.183 | 0.183 | 0.183 |

The surface $s_2$ on the image side of the negative lens component L11 of the first lens group G1 and the surface $S_6$ on the object side of the cemented lens component L21 of the second lens group G2 are aspherical. Values of the fourth-order aspheric coefficient $C_4$, the sixth-order aspheric coefficient $C_6$, the eighth-order aspheric coefficient $C_8$ and the tenth-order aspheric coefficient $C_{10}$ and the conic coefficients $\kappa$ of the surfaces $s_2$ and $S_6$ are tabulated in Table 3.

TABLE 3

| si | κ | $C_4$ | $C_6$ | $C_8$ | $C_{10}$ |
|---|---|---|---|---|---|
| 2 | −1.8675 | +0.22999 × 10$^{-0}$ | −0.71376 × 10$^{-1}$ | +0.00000 | +0.00000 |
| 6 | −0.6823 | +0.67478 × 10$^{-1}$ | +0.12900 × 10$^{-0}$ | −0.14122 × 10$^{-0}$ | +0.33428 × 10$^{-0}$ |

TABLE 1

| si ri | di | ni | vi |
|---|---|---|---|
| 1 r1 = 23.9432 | d1 = 0.124 | n1 = 1.74432 | v1 = 49.2 |
| 2 r2 = 0.8326(ASP) | d2 = 0.358 | | |
| 3 r3 = 1.6598 | d3 = 0.173 | n2 = 1.84666 | v2 = 23.8 |
| 4 r4 = 4.4809 | d4 = variable | | |
| 5 r5 = INFINITY | d5 = 0.012 | | Aperture stop |
| 6 r6 = 0.8025(ASP) | d6 = 0.427 | n3 = 1.80610 | v3 = 40.7 |
| 7 r7 = 1.7051 | d7 = 0.100 | n4 = 1.92286 | v4 = 20.9 |
| 8 r8 = 0.7035 | d8 = 0.075 | | |
| 9 r9 = 2.0012 | d9 = 0.194 | n5 = 1.65160 | v5 = 58.4 |
| 10 r10 = −2.5854 | d10 = variable | | |
| 11 r11 = 2.0719 | d11 = 0.212 | n6 = 1.49700 | v6 = 80.2 |
| 12 r12 = 82.9807 | d12 = variable | | |
| 13 r13 = INFINITY | d13 = 0.406 | n7 = 1.51633 | v7 = 64.2 |
| | | | Protective glass plate |
| 14 r14 = INFINITY | Back focus | | |

In the varifocal zoom lens 1, the surface separation $d_4$ between the first lens group G1 and the aperture stop S, the surface separation $d_{10}$ between the second lens group G2 and the third lens group G3 and the surface separation $d_{12}$ between the third lens group G3 and a protective glass plate GL are variable when the lens state is changed. Table 2 shows values of the surface separations $d_4$, $D_{10}$ and $d_{12}$ in the varifocal zoom lens in the numerical example 1 in a shortest-focal-length lens state, a middle-focal-length lens state and Values of the terms of Expressions (1) to (7) for the numerical example 1 are tabulated in Table 4.

TABLE 4

| f1 | −2.011 |
|---|---|
| f2 | +1.919 |
| (1)Ds/(R22a − R21b) | 0.058 |
| (2)Da/R21b | 0.766 |
| (3)|f1|/fw | −2.011 |
| (4)(R22a + R22b)/(R22a − R22b) | −0.127 |
| (5)f2/fw | 1.919 |
| (6) Σ 2/fw | 0.796 |
| (7)TLw/fw | 6.360 |

Figure 3:
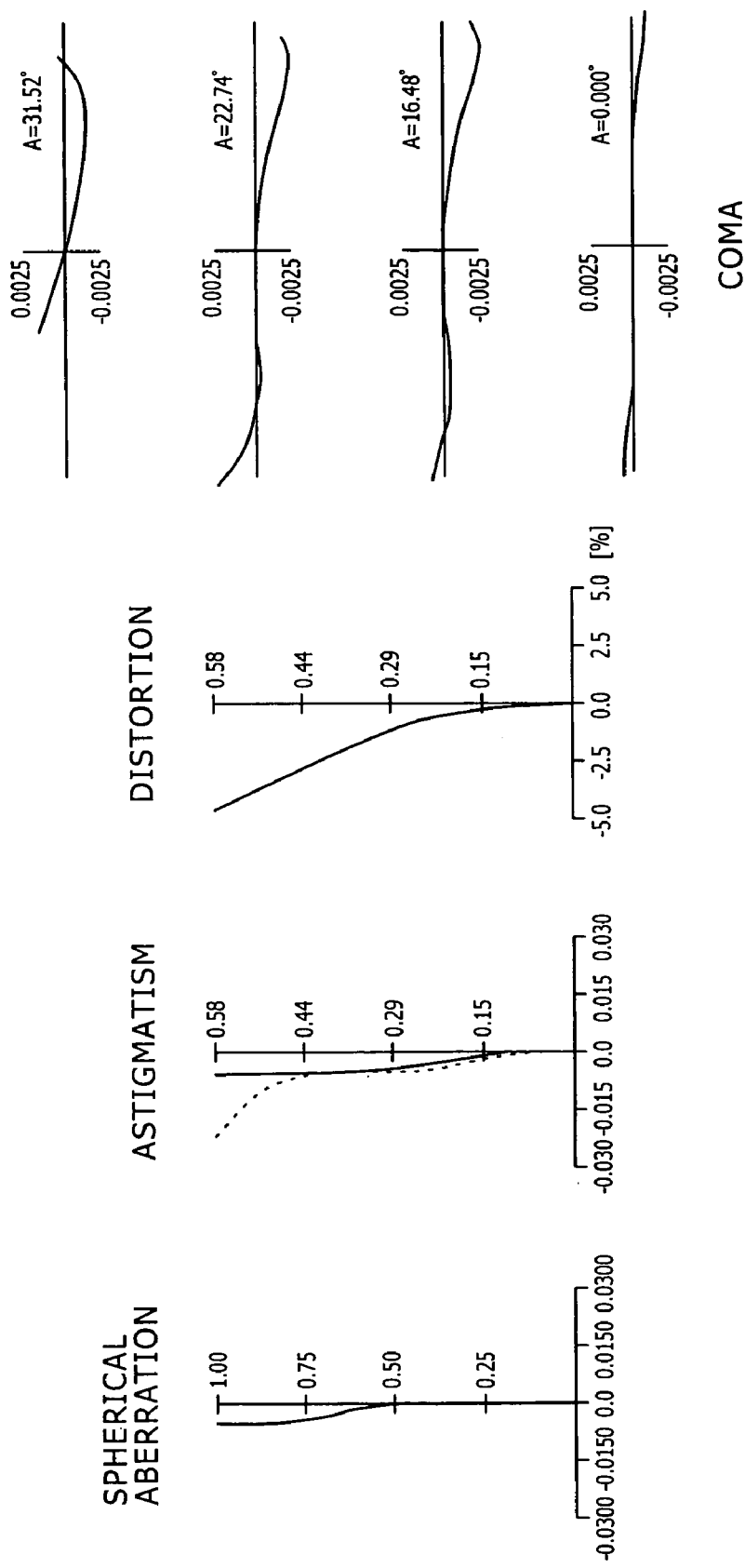
FIG. 3 is diagrams showing spherical aberration, astigmatism, distortion and coma caused by a varifocal zoom lens in a numerical example 1 of the first embodiment in a shortest-focal-length lens state.
Figure 4:
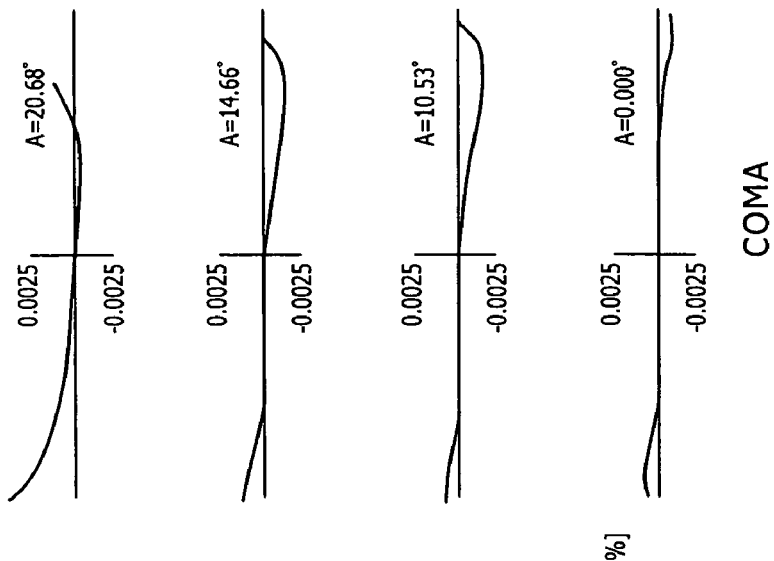
FIG. 4 is diagrams showing spherical aberration, astigmatism, distortion and coma caused by the varifocal zoom lens in the numerical example 1 of the first embodiment in a middle-focal-length lens state.
Figure 5:
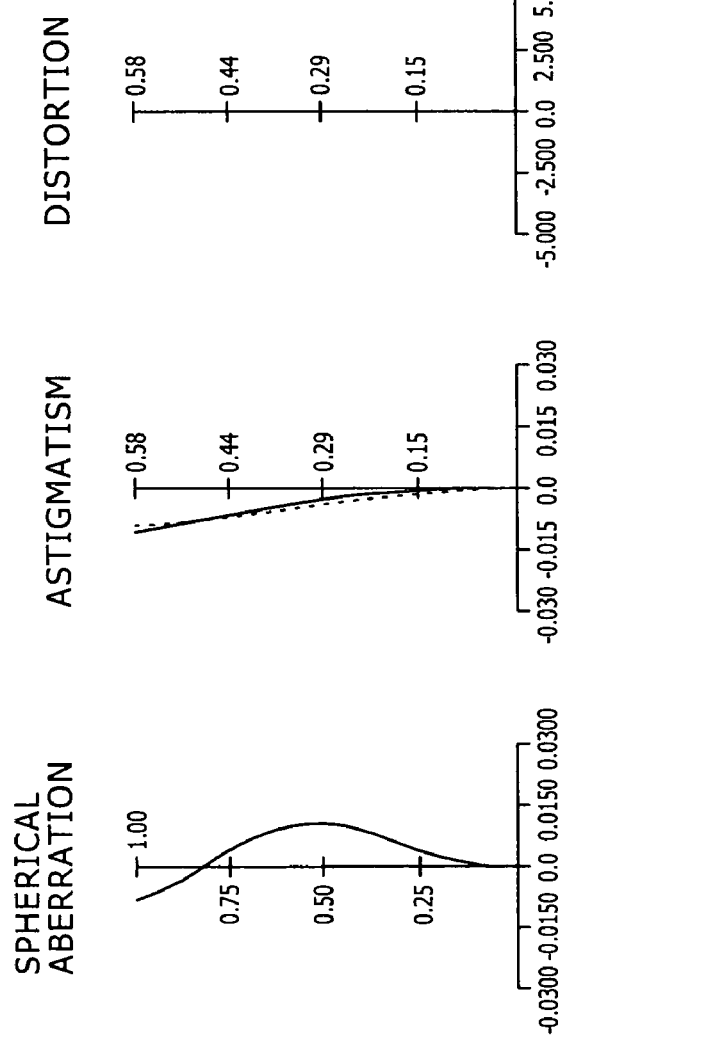
FIG. 5 is diagrams showing spherical aberration, astigmatism, distortion and coma caused by a varifocal zoom lens in the numerical example 1 of the first embodiment in a longest-focal-length lens state.

FIGS. 3, 4 and 5 are diagrams showing spherical aberration, astigmatism, distortion and coma caused by a varifocal zoom lens in the numerical example 1 of the first embodiment in a shortest-focal-length lens state (f=1.000), in a middle-focal-length lens state (f=1.581) and in a longest-focal-length lens state (f=3.296), respectively. In the diagrams of astigmatism, continuous lines and broken lines indicate sagittal image surfaces and meridional image surfaces, respectively, when the varifocal zoom lens in the numerical example 1 is focused on an object at infinity. In the diagrams of coma, "A" indicates field angle.

It is obvious from the aberration diagrams shown in FIGS. 3 to 5 that the varifocal zoom lens in the numerical example 1 is capable of satisfactorily correcting aberrations.

Figure 6:
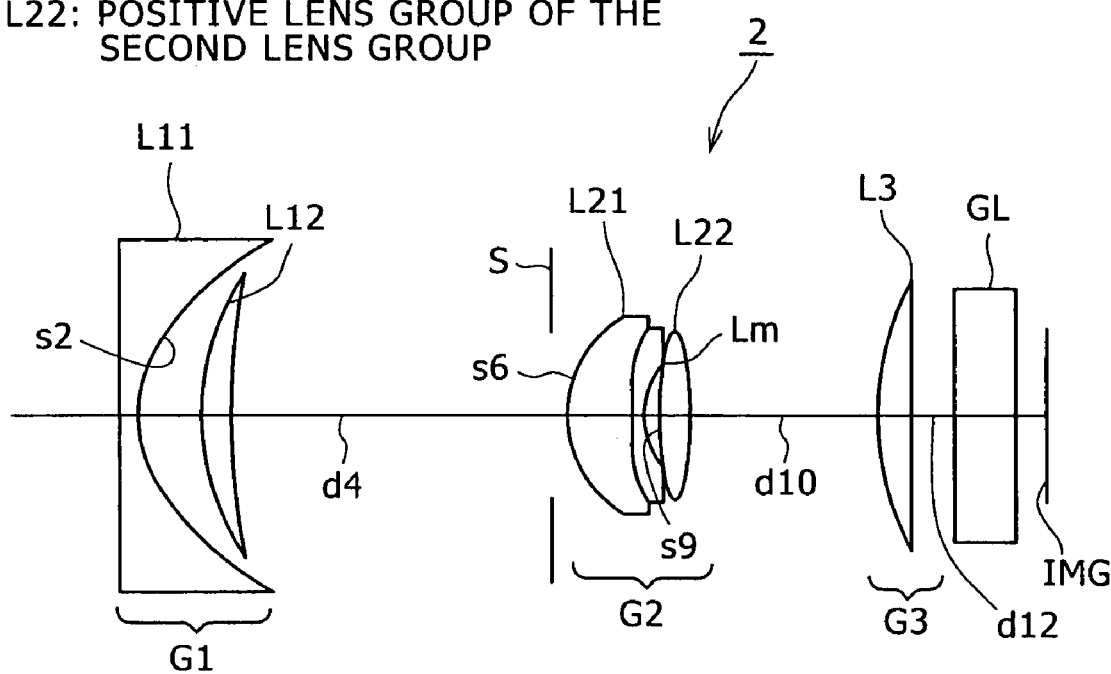
FIG. 6 is a diagrammatic view of a varifocal zoom lens in a second embodiment according to the present invention.

FIG. 6 shows a varifocal zoom lens 2 in a second embodiment according to the present invention. A first lens group G1 includes a negative lens component L11 having a concave surface facing the image side and a positive lens component L12 having a convex surface facing the object side. A second lens group G2 includes a cemented lens component L21 including a positive lens having a convex surface facing the object side and a negative lens having a concave surface facing the image side and a biconvex positive lens component L22. A third lens group G3 has a positive lens component L3. A contact edge Lm is formed in a surface on the image side of the cemented lens component L21 of the second lens group G2 in a circular area near and outside a circle of the effective diameter of the cemented lens component L21. A surface $s_9$ on the object side of the positive lens component L22 is in contact with the contact edge Lm. Thus the second lens group G2 has the so-called peripheral-contact construction.

In the varifocal zoom lens 2 in the second embodiment, an aperture stop S is disposed in front of the second group G2. The aperture stop S moves together with the second lens group G2 when the lens state of the varifocal zoom lens 2 is changed.

Table 5 shows numerical values of dimensions of a varifocal zoom lens in a numerical example 2 of the varifocal zoom lens 2 in the second embodiment. Symbols shown in Table 5 are the same in meaning as those shown in Table 1.

TABLE 6

| | Focal length | | |
|---|---|---|---|
| | 1.000 | 1.701 | 2.826 |
| F number | 2.88 | 3.73 | 5.12 |
| 2ω (°) | 66.83 | 41.34 | 25.21 |
| d4 | 2.369 | 1.079 | 0.346 |
| d10 | 1.225 | 2.051 | 3.378 |
| d12 | 0.300 | 0.300 | 0.300 |
| Back focus | 0.196 | 0.196 | 0.196 |

The surface $s_2$ on the image side of the negative lens component L11 of the first lens group G1 and the surface $s_6$ on the object side of the cemented lens component L21 of the second lens group G2 are aspherical. Values of the fourth-order aspheric coefficient $C_4$, the sixth-order aspheric coefficient $C_6$, the eighth-order aspheric coefficient $C_8$ and the tenth-order aspheric coefficient $C_{10}$ and the conic coefficients κ of the surfaces $s_2$ and $s_6$ are tabulated in Table 7.

TABLE 7

| si | κ | $C_4$ | $C_6$ | $C_8$ | $C_{10}$ |
|---|---|---|---|---|---|
| 2 | −1.9870 | +0.21279 × $10^{-0}$ | −0.61470 × $10^{-1}$ | +0.00000 | +0.00000 |
| 6 | −0.3942 | +0.62924 × $10^{-2}$ | +0.12817 × $10^{-0}$ | −0.47535 × $10^{-0}$ | +0.94302 × $10^{-0}$ |

TABLE 5

| si ri | di | ni | vi |
|---|---|---|---|
| 1 r1 = 15.3786 | d1 = 0.134 | n1 = 1.77250 | v1 = 49.6 |
| 2 r2 = 0.8810(ASP) | d2 = 0.449 | | |
| 3 r3 = 1.8130 | d3 = 0.170 | n2 = 1.84666 | v2 = 23.8 |
| 4 r4 = 3.9849 | d4 = variable | | |
| 5 r5 = INFINITY | d5 = 0.013 | | Aperture stop |
| 6 r6 = 0.7917(ASP) | d6 = 0.429 | n3 = 1.80610 | v3 = 40.7 |
| 7 r7 = 1.7990 | d7 = 0.107 | n4 = 1.92286 | v4 = 20.9 |
| 8 r8 = 0.6948 | d8 = 0.077 | | |
| 9 r9 = 2.2859 | d9 = 0.186 | n5 = 1.72916 | v5 = 54.7 |
| 10 r10 = −2.9293 | d10 = variable | | |
| 11 r11 = 2.0847 | d11 = 0.229 | n6 = 1.49700 | v6 = 80.2 |
| 12 r12 = 87.2758 | d12 = variable | | |
| 13 r13 = INFINITY | d13 = 0.437 | n7 = 1.51633 | v7 = 64.2 Protective glass plate |
| 14 r14 = INFINITY | Back focus | | |

In the varifocal zoom lens 2, the surface separation $d_4$ between the first lens group G1 and the aperture stop S, the surface separation $d_{10}$ between the second lens group G2 and the third lens group G3 and the surface separation $d_{12}$ between the third lens group G3 and a protective glass plate GL are variable when the lens state is changed. Table 6 shows values of the surface separations $d_4$, $D_{10}$ and $d_{12}$ in the varifocal zoom lens in the numerical example 2 in a shortest-focal-length lens state, a middle-focal-length lens state and a longest-focal-length lens state, respectively, F numbers and field angles 2ω° for focal lengths.

Values of the terms of Expressions (1) to (7) for the numerical example 2 are tabulated in Table 8.

TABLE 8

| f1 | −2.087 |
|---|---|
| f2 | +1.921 |
| (1)Ds/(R22a − R21b) | 0.048 |
| (2)Da/R21b | 0.790 |
| (3)|f1|/fw | −2.087 |
| (4)(R22a + R22b)/(R22a − R22b) | −0.123 |
| (5)f2/fw | 1.921 |
| (6) Σ 2/fw | 0.799 |
| (7)TLw/fw | 6.323 |

Figure 7:
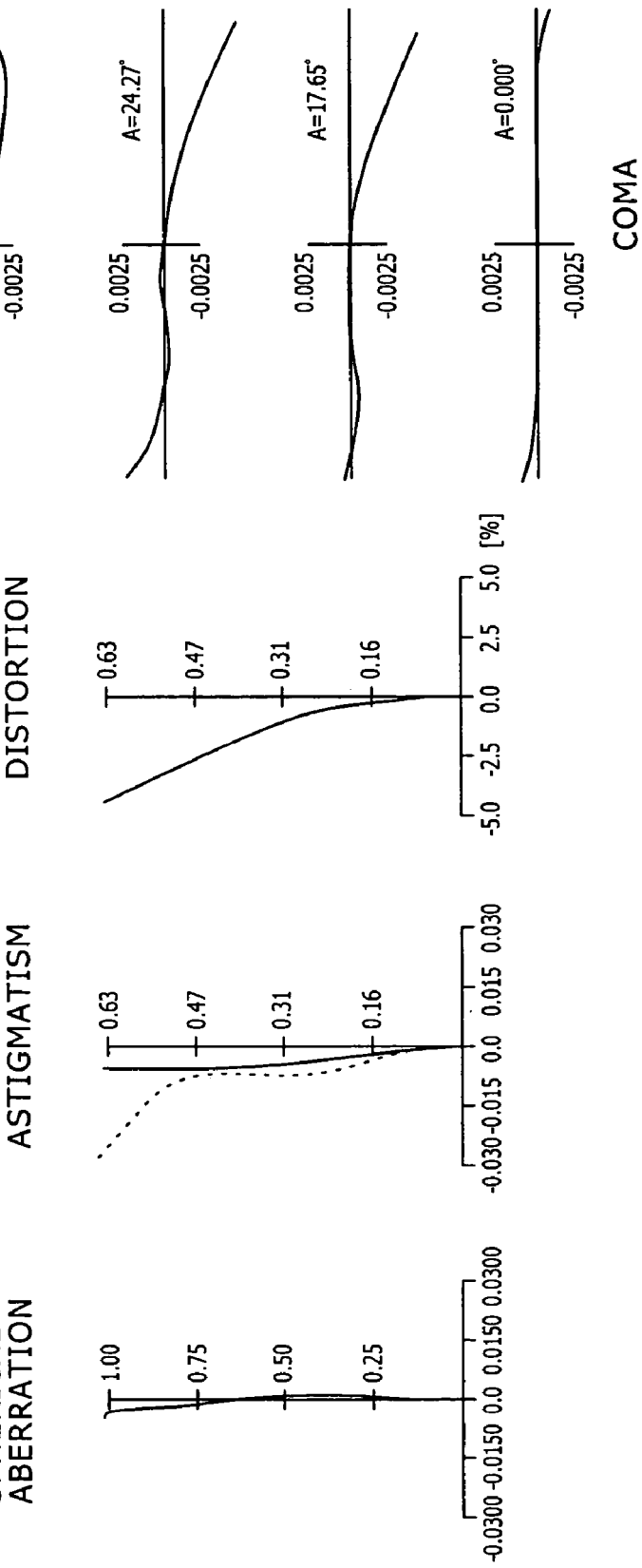
FIG. 7 is diagrams showing spherical aberration, astigmatism, distortion and coma caused by a varifocal zoom lens in a numerical example 2 of the second embodiment in a shortest-focal-length lens state.
Figure 8:
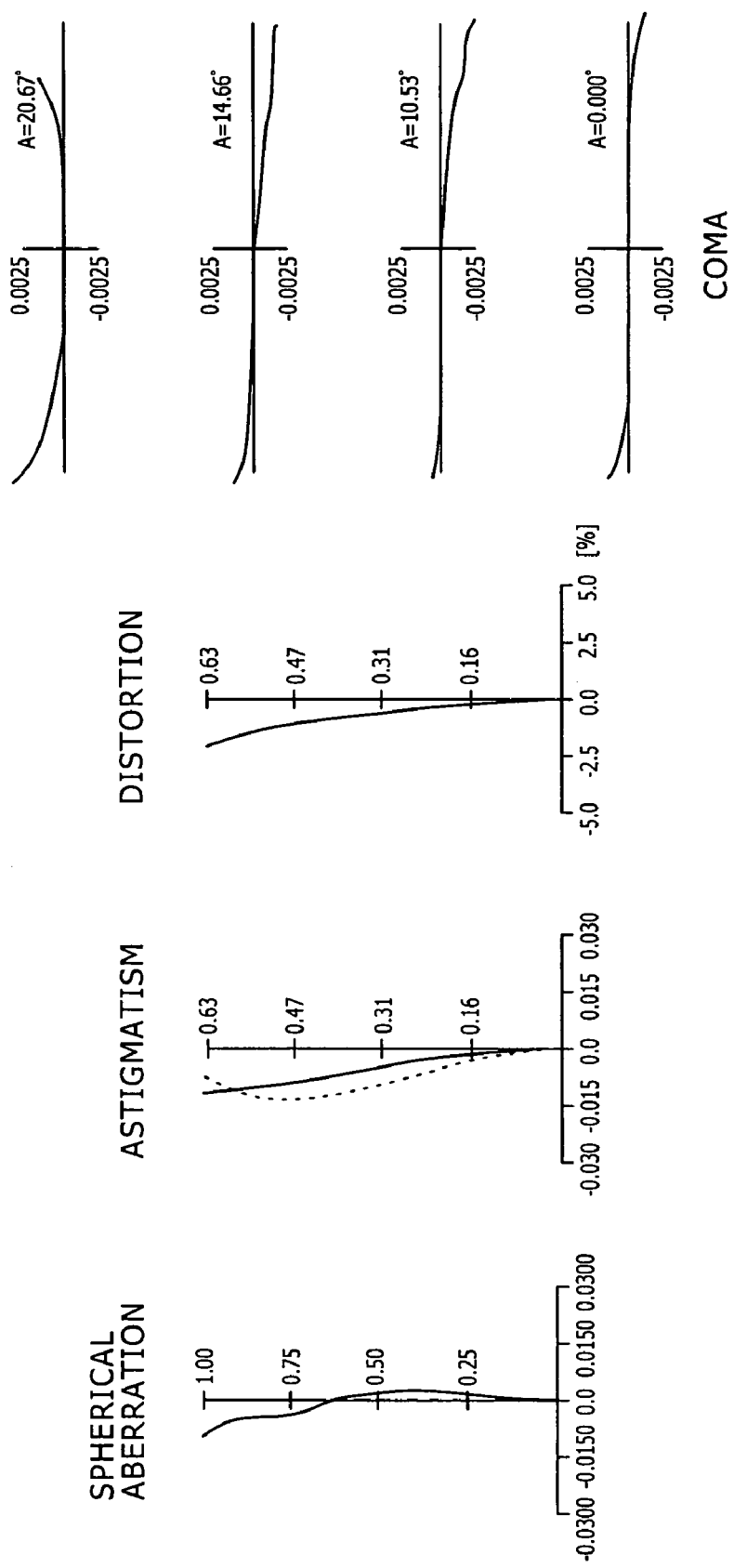
FIG. 8 is diagrams showing spherical aberration, astigmatism, distortion and coma caused by the varifocal zoom lens in the numerical example 2 of the second embodiment in a middle-focal-length lens state.

FIGS. 7, 8 and 9 are diagrams showing spherical aberration, astigmatism, distortion and coma caused by a varifocal zoom lens in the numerical example 2 of the second embodiment in a shortest-focal-length lens state (f=1.000), in a middle-focal-length lens state (f=1.581) and in a longest-focal-length lens state (f=3.296), respectively, when the varifocal zoom lens in the second numerical example 2 is focused on an object at infinity. In the diagrams of astigmatism, continuous lines and broken lines indicate sagittal image surfaces and meridional image surfaces, respectively. In the diagrams of coma, "A" indicates field angle.

It is obvious from the aberration diagrams shown in FIGS. 7 to 9 that the varifocal zoom lens in the numerical example 2 is capable of satisfactorily correcting aberrations and has an excellent image forming ability.

Figure 10:
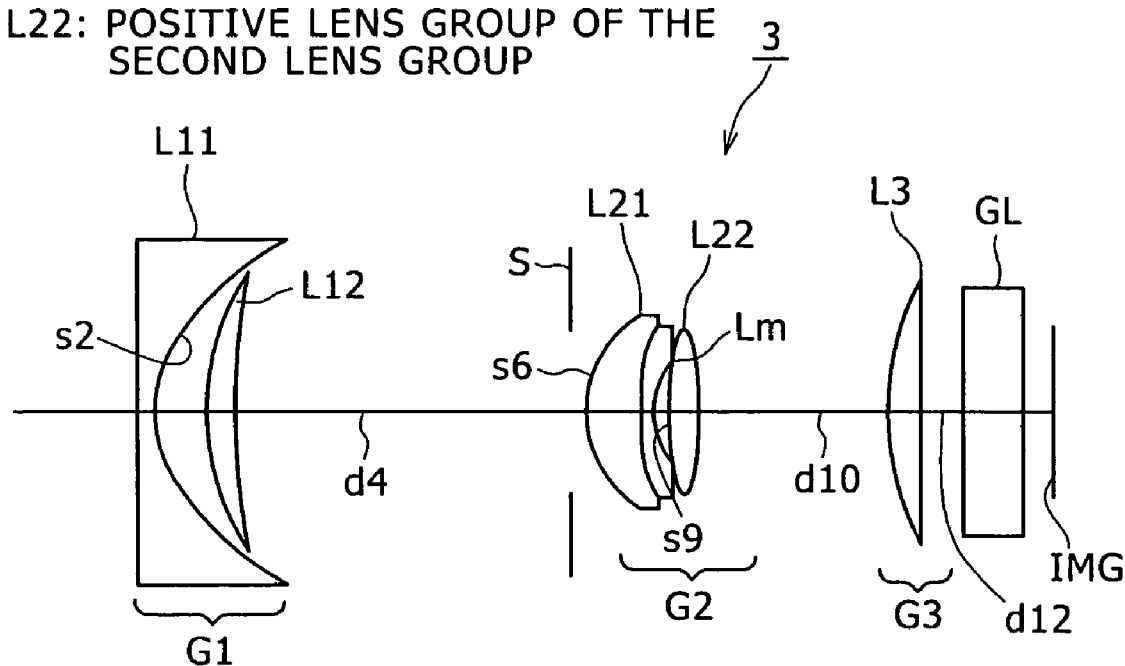
FIG. 10 is a diagrammatic view of a varifocal zoom lens in a third embodiment according to the present invention.

FIG. 10 shows a varifocal zoom lens 3 in a third embodiment according to the present invention. A first lens group G1 includes a negative lens component L11 having a concave surface facing the image side and a positive lens component L12 having a convex surface facing the object side. A second lens group G2 includes a cemented lens component L21 including a positive lens having a convex surface facing the object side and a negative lens having a concave surface facing the image side and a biconvex positive lens component L22. A third lens group G3 has a positive lens component L3. A contact edge Lm is formed in a surface on the image side of the cemented lens component L21 of the second lens group G2 in a circular area near and outside a circle of the effective diameter of the cemented lens component L21. A surface $s_9$ on the object side of the positive lens component L22 is in contact with the contact edge Lm. Thus the second lens group G2 has the so-called peripheral-contact construction.

In the varifocal zoom lens 3 in the third embodiment, an aperture stop S is disposed in front of the second group G2. The aperture stop S moves together with the second lens group G2 when the lens state of the varifocal zoom lens 3 is changed.

Table 9 shows numerical values of dimensions of a varifocal zoom lens in a numerical example 3 of the varifocal zoom lens 3 in the third embodiment. Symbols shown in Table 9 are the same in meaning as those shown in Table 1.

TABLE 10

| | Focal length | | |
|---|---|---|---|
| | 1.000 | 1.581 | 2.826 |
| F number | 2.88 | 3.56 | 5.05 |
| 2ω (°) | 63.04 | 41.39 | 23.46 |
| d4 | 2.345 | 1.199 | 0.330 |
| d10 | 1.281 | 1.909 | 3.258 |
| d12 | 0.279 | 0.279 | 0.279 |
| Back focus | 0.183 | 0.183 | 0.183 |

The surface $s_2$ on the image side of the negative lens component L11 of the first lens group G1 and the surface $s_6$ on the object side of the cemented lens component L21 of the second lens group G2 are aspherical. Values of the fourth-order aspheric coefficient $C_4$, the sixth-order aspheric coefficient $C_6$, the eighth-order aspheric coefficient $C_8$ and the tenth-order aspheric coefficient $C_{10}$ and the conic coefficients κ of the surfaces $s_2$ and $s_6$ are tabulated in Table 11.

TABLE 11

| si | κ | $C_4$ | $C_6$ | $C_8$ | $C_{10}$ |
|---|---|---|---|---|---|
| 2 | −1.8370 | +0.24770 × 10⁻⁰ | −0.58783 × 10⁻¹ | +0.00000 | +0.00000 |
| 6 | −0.2459 | +0.50755 × 10⁻¹ | +0.15749 × 10⁻⁰ | −0.11053 × 10⁺¹ | +0.23610 × 10⁺¹ |

TABLE 9

| si ri | di | ni | vi |
|---|---|---|---|
| 1 r1 = 11.7360 | d1 = 0.124 | n1 = 1.77250 | v1 = 49.6 |
| 2 r2 = 0.8326(ASP) | d2 = 0.354 | | |
| 3 r3 = 1.5333 | d3 = 0.170 | n2 = 1.84666 | v2 = 23.8 |
| 4 r4 = 3.3112 | d4 = variable | | |
| 5 r5 = INFINITY | d5 = 0.012 | | Aperture stop |
| 6 r6 = 0.7050(ASP) | d6 = 0.324 | n3 = 1.80610 | v3 = 40.7 |
| 7 r7 = 1.4780 | d7 = 0.100 | n4 = 1.92286 | v4 = 20.9 |
| 8 r8 = 0.6343 | d8 = 0.088 | | |
| 9 r9 = 2.6180 | d9 = 0.171 | n5 = 1.72916 | v5 = 54.7 |
| 10 r10 = −2.4627 | d10 = variable | | |
| 11 r11 = 2.1716 | d11 = 0.193 | n6 = 1.49700 | v6 = 80.2 |
| 12 r12 = 82.9807 | d12 = variable | | |
| 13 r13 = INFINITY | d13 = 0.406 | n7 = 1.51633 | v7 = 64.2 Protective glass plate |
| 14 r14 = INFINITY | Back focus | | |

In the varifocal zoom lens 3, the surface separation $d_4$ between the first lens group G1 and the aperture stop S, the surface separation $d_{10}$ between the second lens group G2 and the third lens group G3 and the surface separation $d_{12}$ between the third lens group G3 and a protective glass plate GL are variable when the lens state is changed. Table 10 shows values of the surface separations $d_4$, $d_{10}$ and $d_{12}$ in the varifocal zoom lens in the numerical example 3 in a shortest-focal-length lens state, a middle-focal-length lens state and a longest-focal-length lens state, respectively, F numbers and field angles 2ω° for focal lengths.

Values of the terms of Expressions (1) to (7) for the numerical example 2 are tabulated in Table 12.

TABLE 12

| f1 | −2.101 |
|---|---|
| f2 | +1.837 |
| (1)Ds/(R22a − R21b) | 0.044 |
| (2)Da/R21b | 0.683 |
| (3)|f1|/fw | −2.101 |
| (4)(R22a + R22b)/(R22a − R22b) | +0.030 |
| (5)f2/fw | 1.837 |
| (6) Σ 2/fw | 0.683 |
| (7)TLw/fw | 6.030 |

Figure 11:
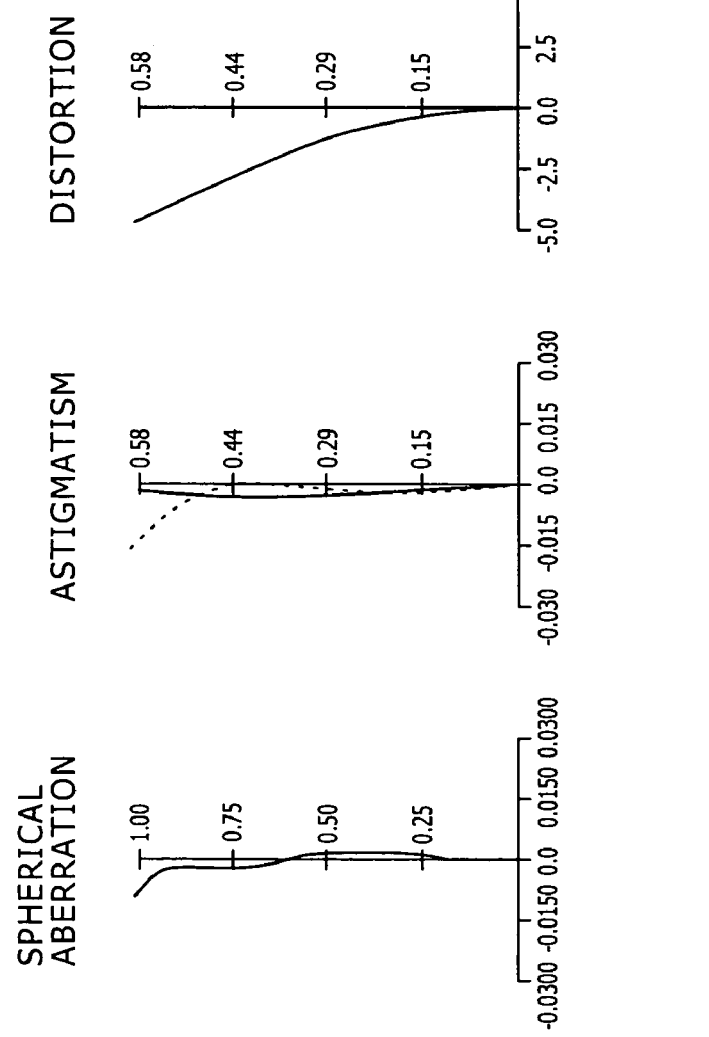
FIG. 11 is diagrams showing spherical aberration, astigmatism, distortion and coma caused by a varifocal zoom lens in a numerical example 3 of the varifocal zoom lens in the third embodiment in a shortest-focal-length lens state.
Figure 12:
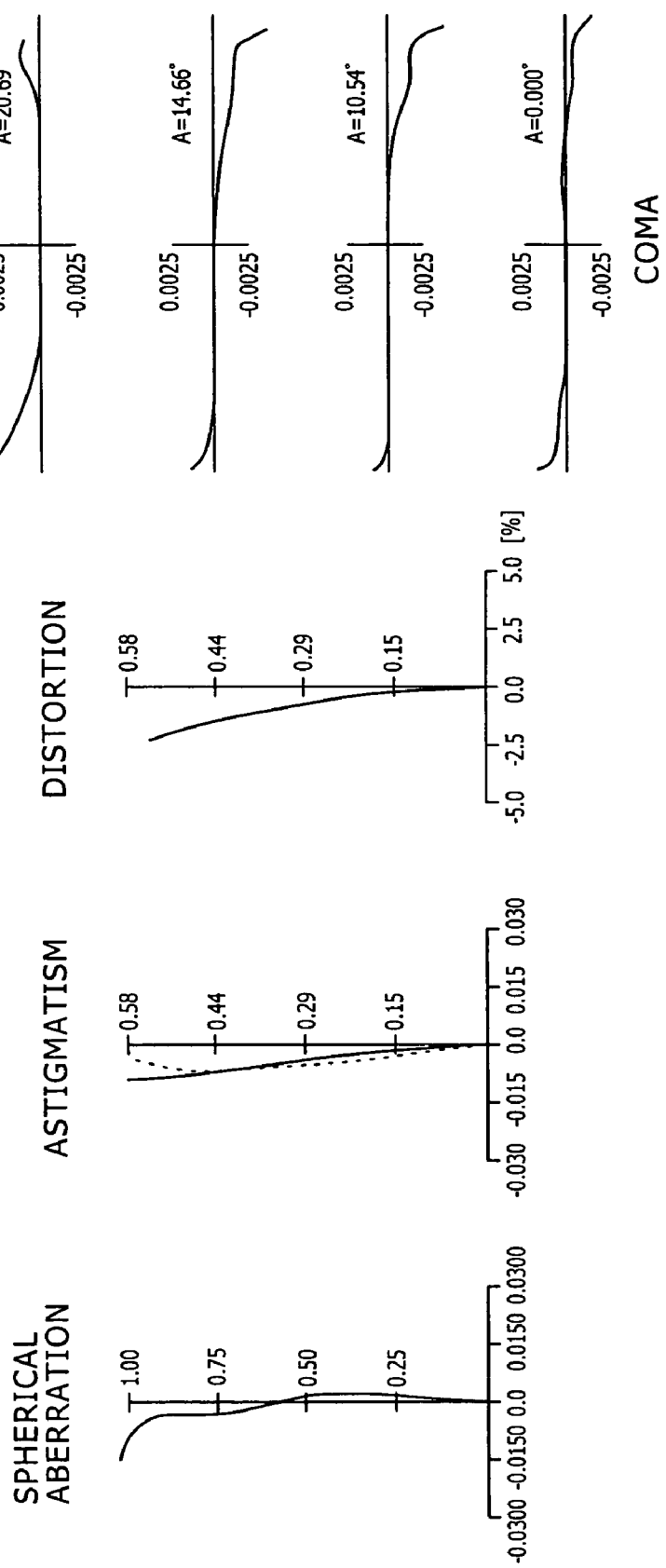
FIG. 12 is diagrams showing spherical aberration, astigmatism, distortion and coma caused by the varifocal zoom lens in the numerical example 3 of the third embodiment in a middle-focal-length lens state.
Figure 13:
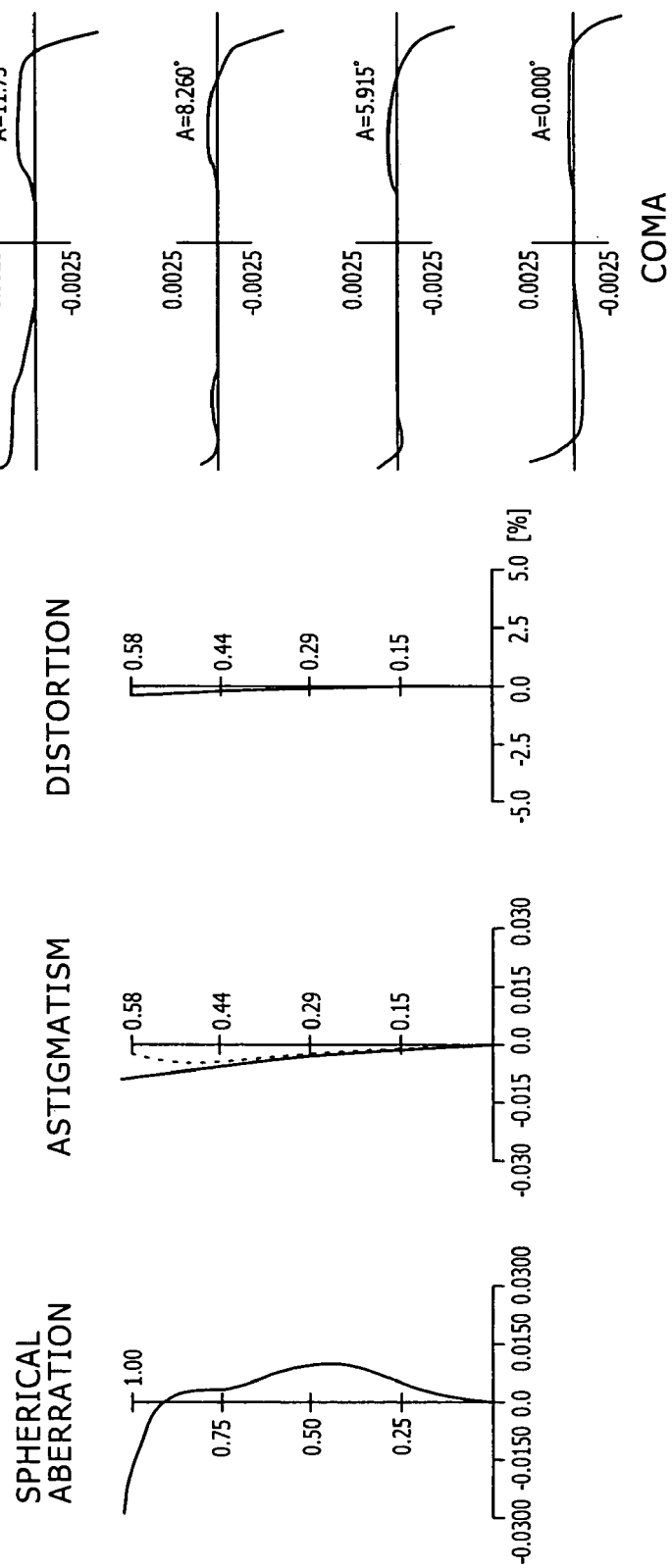
FIG. 13 is diagrams showing spherical aberration, astigmatism, distortion and coma caused by the varifocal zoom lens in numerical example 3 of the third embodiment in a longest-focal-length lens state.

FIGS. 11, 12 and 13 are diagrams showing spherical aberration, astigmatism, distortion and coma caused by a varifocal zoom lens in the numerical example 3 of the third embodiment in a shortest-focal-length lens state (f=1.000), in a middle-focal-length lens state (f=1.581) and in a longest-focal-length lens state (f=3.296), respectively, when the varifocal zoom lens in the third numerical example 3 is focused on an object at infinity. In the diagrams of astigmatism, continuous lines and broken lines indicate sagittal image surfaces and meridional image surfaces, respectively. In the diagrams of coma, "A" indicates field angle.

It is obvious from the aberration diagrams shown in FIGS. 11 to 13 that the varifocal zoom lens in the numerical example 3 is capable of satisfactorily correcting aberrations and has an excellent image forming ability.

Figure 14:
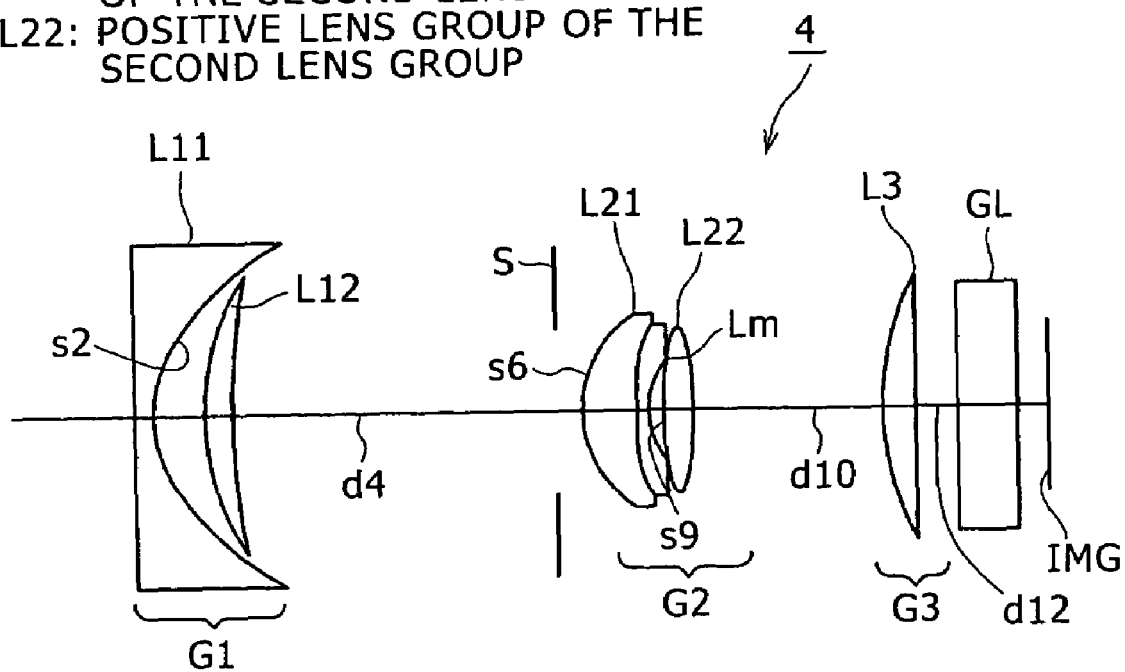
FIG. 14 is a diagrammatic view of a varifocal zoom lens in a fourth embodiment according to the present invention.

FIG. 14 shows a varifocal zoom lens 4 in a fourth embodiment according to the present invention. A first lens group G1 includes a negative lens component L11 having a concave surface facing the image side and a positive lens component L12 having a convex surface facing the object side. A second lens group G2 includes a cemented lens component L21 including a positive lens having a convex surface facing the object side and a negative lens having a concave surface facing the image side and a biconvex positive lens component L22. A third lens group G3 has a positive lens component L3. A contact edge Lm is formed in a surface on the image side of the cemented lens component L21 of the second lens group G2 in a circular area near and outside a circle of the effective diameter of the cemented lens component L21. A surface $s_9$ on the object side of the positive lens component L22 is in contact with the contact edge Lm. Thus the second lens group G2 has the so-called peripheral-contact construction.

In the varifocal zoom lens 4 in the fourth embodiment, an aperture stop S is disposed in front of the second group G2. The aperture stop S moves together with the second lens group G2 when the lens state of the varifocal zoom lens 4 is changed.

Table 13 shows numerical values of dimensions of a varifocal zoom lens in a numerical example 4 of the varifocal zoom lens 4 in the fourth embodiment. Symbols shown in Table 9 are the same in meaning as those shown in Table 1.

TABLE 14

| | Focal length | | |
|---|---|---|---|
| | 1.000 | 1.581 | 2.826 |
| F number | 2.88 | 3.56 | 5.03 |
| 2 ω (°) | 63.04 | 41.39 | 23.46 |
| d4 | 2.367 | 1.208 | 0.328 |
| d10 | 1.256 | 1.869 | 3.183 |
| d12 | 0.279 | 0.279 | 0.278 |
| Back focus | 0.183 | 0.183 | 0.183 |

The surface $s_2$ on the image side of the negative lens component L11 of the first lens group G1 and the surface $S_6$ on the object side of the cemented lens component L21 of the second lens group G2 are aspherical. Values of the fourth-order aspheric coefficient $C_4$, the sixth-order aspheric coefficient $C_6$, the eighth-order aspheric coefficient $C_8$ and the tenth-order aspheric coefficient $C_{10}$ and the conic coefficients κ of the surfaces $s_2$ and $s_6$ are tabulated in Table 15.

TABLE 15

| si | κ | $C_4$ | $C_6$ | $C_8$ | $C_{10}$ |
|---|---|---|---|---|---|
| 2 | −1.7726 | +0.2360 × 10⁻⁰ | −0.5112 × 10⁻¹ | +0.00000 | +0.00000 |
| 6 | −0.1884 | +0.6921 × 10⁻¹ | +0.1118 × 10⁻⁰ | −0.1041 × 10⁺¹ | +0.2051 × 10⁺¹ |

TABLE 13

| si ri | di | ni | vi |
|---|---|---|---|
| 1 r1 = 11.5284 | d1 = 0.124 | n1 = 1.08420 | v1 = 46.5 |
| 2 r2 = 0.8326(ASP) | d2 = 0.342 | | |
| 3 r3 = 1.5284 | d3 = 0.174 | n2 = 1.84666 | v2 = 23.8 |
| 4 r4 = 3.4877 | d4 = variable | | |
| 5 r5 = INFINITY | d5 = 0.012 | | Aperture stop |
| 6 r6 = 0.7236(ASP) | d6 = 0.346 | n3 = 1.80610 | v3 = 40.7 |
| 7 r7 = 1.5617 | d7 = 0.100 | n4 = 1.92286 | v4 = 20.9 |
| 8 r8 = 0.6491 | d8 = 0.084 | | |
| 9 r9 = 2.5257 | d9 = 0.172 | n5 = 1.72916 | v5 = 54.7 |
| 10 r10 = −2.4636 | d10 = variable | | |
| 11 r11 = 2.3033 | d11 = 0.184 | n6 = 1.49700 | v6 = 80.2 |
| 12 r12 = 82.9807 | d12 = variable | | |
| 13 r13 = INFINITY | d13 = 0.406 | n7 = 1.51633 | v7 = 64.2 Protective glass plate |
| 14 r14 = INFINITY | Back focus | | |

In the varifocal zoom lens 4, the surface separation $d_4$ between the first lens group G1 and the aperture stop S, the surface separation $d_{10}$ between the second lens group G2 and the third lens group G3 and the surface separation $d_{12}$ between the third lens group G3 and a protective glass plate GL are variable when the lens state is changed. Table 14 shows values of the surface separations $d_4$, $d_{10}$ and $d_{12}$ in the varifocal zoom lens in the numerical example 4 in a shortest-focal-length lens state, a middle-focal-length lens state and a longest-focal-length lens state, respectively. F numbers and field angles 2ω° for focal lengths.

Values of the terms of Expressions (1) to (7) for the numerical example 4 are tabulated in Table 16.

TABLE 16

| f1 | −2.108 |
|---|---|
| f2 | +1.825 |
| (1)Ds/(R22a − R21b) | 0.041 |
| (2)Da/R21b | 0.706 |
| (3)fl1/fw | −2.108 |
| (4)(R22a + R22b)/(R22a − R22b) | +0.012 |
| (5)f2/fw | 1.825 |
| (6) Σ 2/fw | 0.702 |
| (7)TLw/fw | 6.034 |

Figure 16:
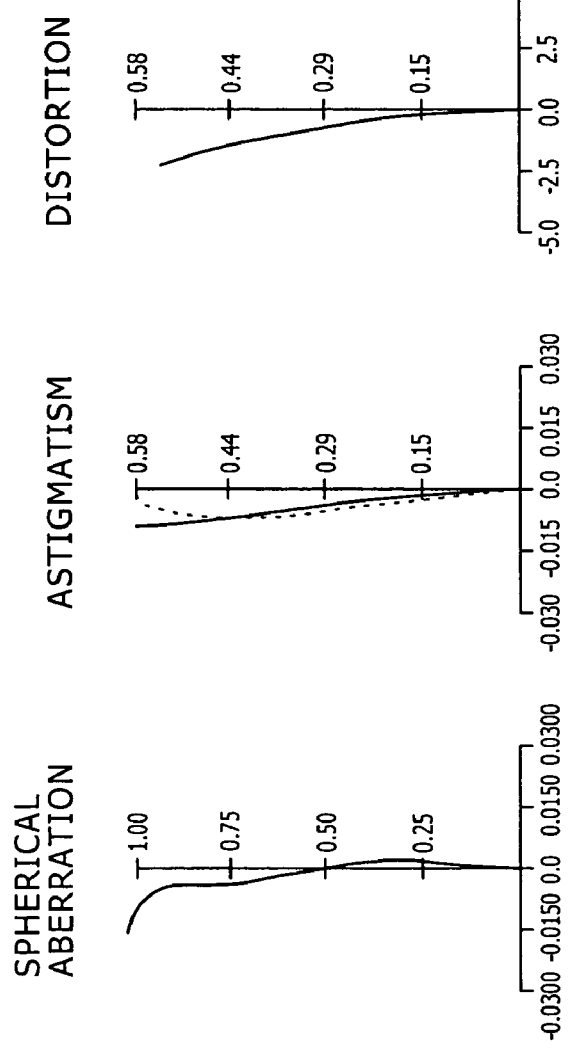
FIG. 16 is diagrams showing spherical aberration, astigmatism, distortion and coma caused by the varifocal zoom lens in the numerical example 4 of the fourth embodiment in a middle-focal-length lens state.
Figure 17:
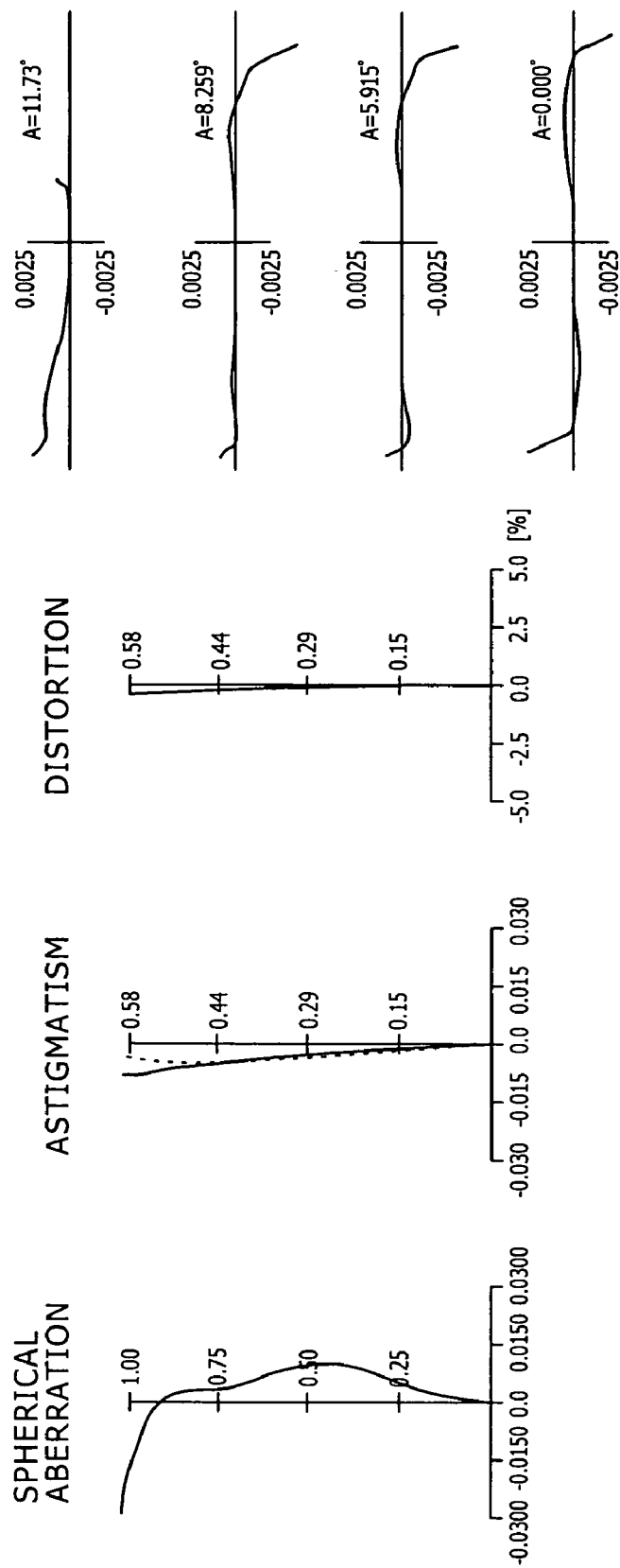
FIG. 17 is diagrams showing spherical aberration, astigmatism, distortion and coma caused by the varifocal zoom lens in the numerical example 4 of the fourth embodiment in a longest-focal-length lens state.

FIGS. 15, 16 and 17 are diagrams showing spherical aberration, astigmatism, distortion and coma caused by a varifocal zoom lens in the numerical example 4 of the fourth embodiment in a shortest-focal-length lens state (f=1.000) in a middle-focal-length lens state (f=1.581) and in a longest-focal-length lens state (f=3.296), respectively, when the varifocal zoom lens in the fourth numerical example 4 is focused on an object at infinity. In the diagrams of astigmatism, continuous lines and broken lines indicate sagittal image surfaces and meridional image surfaces, respectively. In the diagrams of coma, "A" indicates field angle.

It is obvious from the aberration diagrams shown in FIGS. 15 to 17 that the varifocal zoom lens in the numerical example 4 is capable of satisfactorily correcting aberrations and has an excellent image forming ability.

FIG. 18 shows a camera system 10 embodying the present invention. The camera system 10 includes a varifocal zoom lens 20 and an image pickup device 30 for converting optical image formed by the varifocal zoom lens 20 into electric signals. The image pickup device 30 is provided with a photoelectric converter, such as a CCD (charge-coupled device) or a CMOS device (complementary metal-oxide semiconductor device). The varifocal zoom lens 20 may be any one of the varifocal zoom lenses in the first to the fourth embodiment.

The image pickup device 30 gives an electric signal to an image separating circuit 40. The image separating circuit 40 divides the electric signal into an image forming signal and a focusing signal. The image separating circuit 40 gives the focusing signal to a focusing control circuit 50, and gives the image forming signal to an image processing unit. The image forming signal given to the image processing circuit is processed to produce an easy-to-process image signal. The image signal thus produced is used for displaying an image on a display, storing image data in a recording medium and transferring image data to other devices.

An external operation signal is given to the focusing control circuit 50 by operating an operation control button, such as a zoom button. For example, when the zoom button is operated to enter a zooming command signal, drivers 60, 70 and 80 drive, for example, drive devices, such as motors 61, 71 and 81, so that the first lens group G1, the second lens group G2 and the third lens group G3 are moved to predetermined positions to set the varifocal zoom lens 20 for a desired focal length. Position signals provided by sensors 62, 72 and 82 and representing the respective positions of the first lens group G1, the second lens group G2 and the third lens group G3 are given to the focusing control circuit 50, and then the focusing control circuit 50 generates command signals to be given to the drivers 60, 70 and 80 on the basis of the input signals. The focusing control circuit 50 examines the focusing condition on the basis of the signal given thereto by the image separating circuit 40 and controls, for example, the drive circuit 80 to move the third lens group G3 so that the varifocal zoom lens 20 is focused in an optimum accuracy.

Practically, the camera system 10 is one of various products. The camera system 10 can be widely used as a camera unit for digital input/output apparatuses including, for example, digital still cameras, digital video cameras, portable telephones with a camera, and PDAs (personal digital assistants) with a camera.

Although the invention has been described in its preferred embodiments with a certain degree of particularity, obviously many changes and variations are possible therein. It is therefore to be understood that the present invention may be practiced otherwise than as specifically described herein without departing from the scope and spirit thereof.

What is claimed is:

1. A varifocal zoom lens comprising:
   a first lens group having a negative refractive power;
   a second lens group having a positive refractive power, consisting of a cemented lens component L21 formed by combining a positive lens element having a convex surface facing to an object side and a negative lens element having a concave surface facing to an image side and a positive lens component L22 disposed on the image side of the cemented lens component L21, spaced from the cemented lens component L21 by an air space and having a convex surface facing to the object side and disposed on the image side of the first lens group; and
   a third lens group having a positive refractive power and disposed on the image side of the second lens group; wherein
   at least the first and the second lens group are moved and the second lens group is moved toward the object side so as to decrease an interval between the first and the second lens group, when a lens state is changing from a shortest-focal-length lens state for the largest field angle to a longest-focal-length lens state for the smallest field angle, an aperture stop is disposed between the first and the second lens group, and the following conditions are satisfied:

$$0.02 < D_s/(R22_a - R21_b) < 0.1 \quad (1)$$

$$0.6 < D_a/R21_b < 0.8 \quad (2)$$

where $D_s$ is the length of an air space between the cemented lens component L21 and the positive lens component L22, $R22_a$ is the radius of curvature of the surface on the object side of the positive lens component L22, $R21_b$ is the radius of curvature of the surface on the image side of the cemented lens component L21, and $D_a$ is the distance between the aperture stop and the surface on the image side of the cemented lens component L21.

2. The varifocal zoom lens according to claim 1 satisfying the condition expressed by:

$$1.8 < |f_1|/f_w < 2.3 \quad (3)$$

where $f_1$ is the focal length of the first lens group, and $f_w$ is the focal length of the varifocal zoom lens in the shortest-focal-length lens state.

3. The varifocal zoom lens according to claim 1 satisfying at least one of the conditions expressed by expressions:

$$-0.3 < (R22_a + R22_b)/(R22_a - R22_b) < 0.2 \quad (4)$$

$$1.6 < f_2/f_w < 2.1 \quad (5)$$

where $R22_b$ is the radius of curvature of the surface on the image side of the positive lens component L22, and $f_2$ is the focal length of the second lens group.

4. The varifocal zoom lens according to claim 2 satisfying at least one of the conditions expressed by expressions:

$$-0.3 < (R22_a + R22_b)/(R22_a - R22_b) < 0.2 \quad (4)$$

$$1.6 < f_2/f_w < 2.1 \quad (5)$$

where $R22_b$ is the radius of curvature of the surface on the image side of the positive lens component L22, and $f_2$ is the focal length of the second lens group.

5. The varifocal zoom lens according to claim 1 satisfying the conditions expressed by expressions:

$$-0.3 < (R22_a + R22_b)/(R22_a - R22_b) < 0.2 \quad (4)$$

$$1.6 < f_2/f_w < 2.1 \quad (5)$$

where $R22_b$ is the radius of curvature of the surface on the image side of the positive lens component L22, and $f_2$ is the focal length of the second lens group.

6. The varifocal zoom lens according to claim 2 satisfying the conditions expressed by expressions:

$$-0.3 < (R22_a + R22_b)/(R22_a - R22_b) < 0.2 \quad (4)$$

$$1.6 < f_2/f_w < 2.1 \quad (5)$$

where $R22_b$ is the radius of curvature of the surface on the image side of the positive lens component L22, and $f_2$ is the focal length of the second lens group.

7. The varifocal zoom lens according to claim 1 satisfying at least one of the expressions expressed by expressions:

$$\Sigma 2/f_w < 0.85 \quad (6)$$

$$TL_w/f_w < 6.5 \quad (7)$$

where ρ2 is the thickness of the second lens group and $TL_w$ is the length of the varifocal zoom lens in a shortest-focal-length lens state.

8. The varifocal zoom lens according to claim 2 satisfying at least one of the expressions expressed by expressions:

$$\Sigma 2/f_w < 0.85 \quad (6)$$

$$TL_w/f_w < 6.5 \quad (7)$$

where Σ2 is the thickness of the second lens group and $TL_w$ is the length of the varifocal zoom lens in a shortest-focal-length lens state.

9. The varifocal zoom lens according to claim 3 satisfying at least one of the expressions expressed by expressions:

$$\Sigma 2/f_w < 0.85 \quad (6)$$

$$TL_w/f_w < 6.5 \quad (7)$$

where Σ2 is the thickness of the second lens group and $TL_w$ is the length of the varifocal zoom lens in a shortest-focal-length lens state.

10. The varifocal zoom lens according to claim 4 satisfying at least one of the expressions expressed by expressions:

$$\Sigma 2/f_w < 0.85 \quad (6)$$

$$TL_w/f_w < 6.5 \quad (7)$$

where Σ2 is the thickness of the second lens group and $TL_w$ is the length of the varifocal zoom lens in a shortest-focal-length lens state.

11. The varifocal zoom lens according to claim 5 satisfying at least one of the expressions expressed by expressions:

$$\Sigma 2/f_w < 0.85 \quad (6)$$

$$TL_w/f_w < 6.5 \quad (7)$$

where Σ2 is the thickness of the second lens group and $TL_w$ is the length of the varifocal zoom lens in a shortest-focal-length lens state.

12. The varifocal zoom lens according to claim 6 satisfying at least one of the expressions expressed by expressions:

$$\Sigma 2/f_w < 0.85 \quad (6)$$

$$TL_w/f_w < 6.5 \quad (7)$$

where Σ2 is the thickness of the second lens group and $TL_w$ is the length of the varifocal zoom lens in a shortest-focal-length lens state.

13. A camera system comprising: a varifocal zoom lens comprising:
 a first lens group having a negative refractive power;
 a second lens group having a positive refractive power, consisting of a cemented lens component L21 formed by combining a positive lens element having a convex surface facing to an object side and a negative lens element having a concave surface facing to an image side and a positive lens component L22 disposed on the image side of the cemented lens component L21, spaced from the cemented lens component L21 by an air space and having a convex surface facing to the object side and disposed on the image side of the first lens group; and
 a third lens group having a positive refractive power and disposed on the image side of the second lens group;
 wherein at least the first and the second lens group are moved and the second lens group is moved toward the object side so as to decrease an interval between the first and the second lens group, when a lens state is changing from a shortest-focal-length lens state for the largest field angle to a longest-focal-length lens state for the smallest field angle, an aperture stop is disposed between the first and the second lens group, and the following conditions are satisfied:

$$0.02 < D_s/(R22_a - R21_b) < 0.1 \quad (1)$$

$$0.6 < D_a/R21_b < 0.8 \quad (2)$$

where $D_s$ is the length of an air space between the cemented lens component L21 and the positive lens component L22, $R22_a$ is the radius of curvature of the surface on the object side of the positive lens component L22, $R21_b$ is the radius of curvature of the surface on the image side of the cemented lens component L21, and $D_a$ is the distance between the aperture stop and the surface on the image side of the cemented lens component L21.

14. A varifocal zoom lens comprising:
 a first lens group having a negative refractive power;
 a second lens group having a positive refractive power, including a cemented lens component L21 formed by combining a positive lens element having a convex surface facing to an object side and a negative lens element having a concave surface facing to an image side and a positive lens component L22 disposed on the image side of the cemented lens component L21, spaced from the cemented lens component L21 by an air space and having a convex surface facing to the object side and disposed on the image side of the first lens group; and
 a third lens group having a positive refractive power and disposed on the image side of the second lens group;
 wherein at least the first and the second lens group are moved and the second lens group is moved toward the object side so as to decrease an interval between the first and the second lens group, when a lens state is changing from a shortest-focal-length lens state for the largest field angle to a longest-focal-length lens state for the smallest field angle, an aperture stop is disposed between the first and the second lens group, and an image can be shifted by shifting one of the lens groups in a direction substantially perpendicular to the optical axis.

15. The varifocal zoom lens according to claim 14, wherein the second lens group consists of the cemented lens component L21 and the positive lens component L22.

16. The varifocal zoom lens according to claim 15, wherein the following condition is satisfied:

$$0.02 < D_s/(R22_a - R21_b) < 0.1 \quad (1)$$

$$0.6 < D_a/R21_b < 0.8 \quad (2)$$

where $D_s$ is the length of an air space between the cemented lens component L21 and the positive lens component L22, $R22_a$ is the radius of curvature of the surface on the object side of the positive lens component L22, $R21_b$ is the radius of curvature of the surface on the image side of the cemented lens component L21, and $D_a$ is the distance between the aperture stop and the surface on the image side of the cemented lens component L21.

17. The varifocal zoom lens according to claim 16, wherein the following condition is satisfied:

$$1.8 < |f1|/fw < 2.3$$

where $f_1$ is the focal length of the first lens group, and $f_w$ is the focal length of the varifocal zoom lens in the shortest-focal-length lens state.

* * * * *

UNITED STATES PATENT AND TRADEMARK OFFICE
CERTIFICATE OF CORRECTION

PATENT NO. : 7,133,215 B2
APPLICATION NO. : 11/144841
DATED : November 7, 2006
INVENTOR(S) : Motoyuki Otake Page 1 of 1

It is certified that error appears in the above-identified patent and that said Letters Patent is hereby corrected as shown below:

Column 23, Line 4:
"ρ2" should read -- Σ2 --.

Column 23, Line 55:
"comprising:" should read -- comprising --.

Column 25, Line 4:
"$1.8<|f1|/fw<2.3$" should read -- $1.8<|f_1|/f_w<2.3$ --.

Signed and Sealed this

Eighteenth Day of December, 2007

JON W. DUDAS
*Director of the United States Patent and Trademark Office*

(12) EX PARTE REEXAMINATION CERTIFICATE (7782nd)
United States Patent
Otake

(10) Number: US 7,133,215 C1
(45) Certificate Issued: Sep. 28, 2010

(54) VARIFOCAL ZOOM LENS AND CAMERA SYSTEM

(75) Inventor: Motoyuki Otake, Saitama (JP)

(73) Assignee: Sony Corporation, Shinagawa-Ku, Tokyo (JP)

Reexamination Request:
No. 90/009,353, Dec. 8, 2008

Reexamination Certificate for:
Patent No.: 7,133,215
Issued: Nov. 7, 2006
Appl. No.: 11/144,841
Filed: Jun. 6, 2005

Certificate of Correction issued Dec. 18, 2007.

(30) Foreign Application Priority Data

Jun. 10, 2004 (JP) ............................ P2004-172916

(51) Int. Cl.
*G02B 15/14* (2006.01)

(52) U.S. Cl. .................. 359/689; 359/557; 359/680; 359/681; 359/682; 359/683; 359/716; 359/740; 359/784; 359/753

(58) Field of Classification Search .................. None
See application file for complete search history.

(56) References Cited

FOREIGN PATENT DOCUMENTS

| JP | 2001-281545 | 10/2001 |
| JP | 2002-139671 | 5/2002 |
| JP | 2003-140042 | 5/2003 |

*Primary Examiner* — Tuan H Nguyen

(57) ABSTRACT

A varifocal zoom lens includes: a first lens group having a negative refractive power; a second lens group having a positive refractive power, including a cemented lens component L21 formed by combining a positive lens having a convex surface on the object side and a negative lens having a concave surface on an image side and a positive lens component L22 disposed on the image side with respect to the cemented lens component L21, spaced from the cemented lens component L21 by an air space and having a convex surface on the object side and disposed behind the first lens group with respect to an object side; and a third lens group having a positive refractive power and disposed behind the second lens group with respect to the object side. At least the first and the second lens group are moved and the second lens group is moved toward the object side so as to decrease an interval between the first and the second lens group, when a lens state is changed from a shortest-focal-length lens state to a longest-focal-length lens state, an aperture stop is disposed between the first and the second lens group, and the second lens group includes and satisfies conditions expressed by:

$$0.02 < D_s/(R22_a - R21_b) < 0.1 \quad (1)$$

$$0.6 < D_a/R21_b < 0.8 \quad (2)$$

where $D_s$ is the length of an air space between the cemented lens component L21 and the positive lens component L22, $R22_a$ is the radius of curvature of the surface on the object side of the positive lens component L22, $R21_b$ is the radius of curvature of the surface on the image side of the cemented lens component L21, and $D_a$ is the distance between the aperture stop and the surface on the image side of the cemented lens component L21.

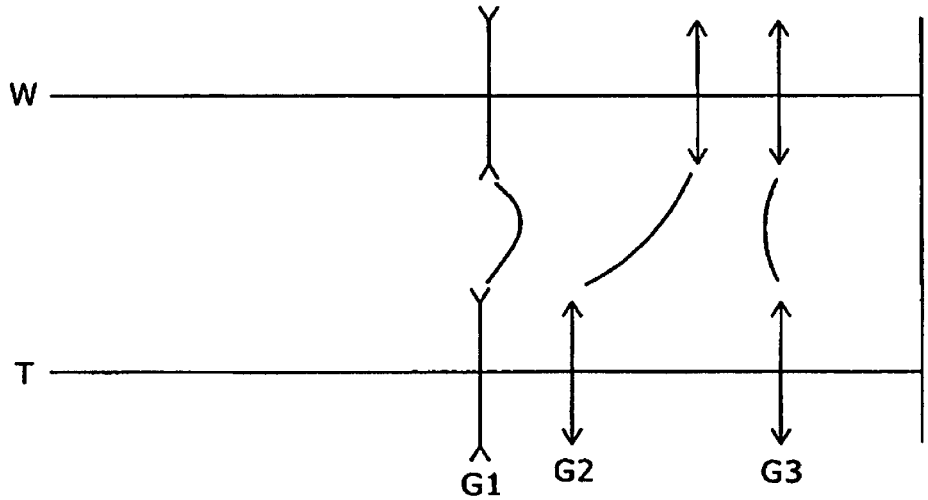

G1: FIRST LENS GROUP
G2: SECOND LENS GROUP
G3: THIRD LENS GROUP

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 14, 15, 16 and 17 are cancelled.

Claims 1, 3, 4, 5, 6 and 13 are determined to be patentable as amended.

Claims 2, 7, 8, 9, 10, 11 and 12, dependent on an amended claim, are determined to be patentable.

New claims 18-21 are added and determined to be patentable.

1. A varifocal zoom lens comprising:
a first lens group having a negative refractive power;
a second lens group having a positive refractive power, consisting of a cemented lens component [L21] formed by combining a positive lens element having a convex surface facing to an object side and a negative lens element having a concave surface facing to an image side and a positive lens component [L 22] disposed on the image side of the cemented lens component[L21], spaced from the cemented lens component [L21] by an air space and having a convex surface facing to the object side and disosed on the image side of the first lens group; and
a third lens group having a positive refractive power and disposed on the image side of the second lens group; wherein
at least the first and the second lens group are moved and the second lens group is moved toward the object side so as to decrease an interval between the first and the second lens group, when a lens state is changing from a shortest-focal-length lens state for the largest field angle to a longest-focal-length lens state for the smallest field angle, an aperture stop is disposed between the first and the second lens group, and the following conditions are satisfied:

$$0.02 < D_s/(R22_a - R21_b) < 0.1 \quad (1)$$

$$0.6 < D_a/R21_b < 0.8 \quad (2)$$

where $D_s$ is the length of an air space between the cemented lens component[L21] and the positive lens component[L22], $R22_a$ is the radius of curvature of the surface on the object side of the positive lens component[L22], $R21_b$ is the radius of curvature of the surface on the image side of the cemented lens component[L21], and $D_a$ is the distance between the aperture stop and the surface on the image side of the cemented lens component[L21].

3. The varifocal zoom lens according to claim 1 satisfying at least one of the conditions expressed by expressions:

$$-0.3 < (R22_a + R22_b)/(R22_a - R22_b) < 0.2 \quad (4)$$

$$1.6 < f_2/f_w < 2.1 \quad (5)$$

where $R22_b$ is the radius of curvature of the surface on the image side of the positive lens component[L22], and $f_2$ is the focal length of the second lens group.

4. The varifocal zoom lens according to claim 2 satisfying at least one of the conditions expressed by expressions:

$$-0.3 < (R22_a + R22_b)/(R22_a - R22_b) < 0.2 \quad (4)$$

$$1.6 < f_2/f_w < 2.1 \quad (5)$$

where $R22_b$ is the radius of curvature of the surface on the image side of the positive lens component[L22], and $f_2$ is the focal length of the second lens group.

5. The varifocal zoom lens according to claim 1 satisfying the conditions expressed by expressions:

$$-0.3 < (R22_a + R22_b)/(R22_a - R22_b) < 0.2 \quad (4)$$

$$1.6 < f_2/f_w < 2.1 \quad (5)\text{ ps}$$

where $R22_b$ is the radius of curvature of the surface on the image side of the positive lens component[L22], and $f_2$ is the focal length of the second lens group.

6. The varifocal zoom lens according to claim 2 satisfying the conditions expressed by expressions:

$$-0.3 < (R22_a + R22_b)/(R22_a - R22_b) < 0.2 \quad (4)$$

$$1.6 < f_2/f_w < 2.1 \quad (5)$$

where $R22_b$ is the radius of curvature of the surface on the image side of the positive lens component[L22], and $f_2$ is the focal length of the second lens group.

13. A camera system comprising a varifocal zoom lens comprising:
a first lens group having a negative refractive power;
a second lens group having a positive refractive power, consisting of a cemented lens component formed by combining a positive lens element having a convex surface facing to an object side and a negative lens element having a concave surface facing to an image side and a positive lens component disposed on the image side of the cemented lens component, spaced from the cemented lens component by an air space and having a convex surface facing to the object side and disposed on the image side of the first lens group; and
a third lens group having a positive refractive power and disposed on the image side of the second lens group;
wherein at least the first and the second lens group are moved and the second lens group is moved toward the object side so as to decrease an interval between the first and the second lens group, when a lens state is changing from a shortest-focal-length lens state for the largest field angle to a longest-focal-length lens state for the smallest field angle, an aperture stop is disposed between the first and the second lens group, and the following conditions are satisfied:

$$0.02 < D_s/(R22_a - R21_b) < 0.1 \quad (1)$$

$$0.6 < D_a/R21_b < 0.8 \quad (2)$$

where $D_s$ is the length of an air space between the cemented lens component [L21] and the positive lens component[L22], $R22_a$ is the radius of curvature of the surface on the object side of the positive lens component[L22], $R21_b$ is the radius of curvature of the surface on the image side of the cemented lens component[L21], and $D_a$ is the distance between the aperture stop and the surface on the image side of the cemented lens component[L21].

18. A varifocal zoom lens comprising:

a first lens group having a negative refractive power;

a second lens group having a positive refractive power, consisting of a cemented lens component formed by combining a positive lens element having a convex surface facing to an object side and a negative lens element having a concave surface facing to an image side and a positive lens component disposed on the image side of the cemented lens component, spaced from the cemented lens component by an air space and having a convex surface facing to the object side and disposed on the image side of the first lens group; and a third lens group having a positive refractive power and disposed on the image side of the second lens group;

wherein at least the first and the second lens group are moved and the second lens group is moved toward the object side so as to decrease an interval between the first and the second lens group, when a lens state is changing from a shoftest-focal-length lens state for the largest field angle to a longest-focal-length lens state for the smallest field angle, an aperture stop is disposed between the first and the second lens group, and the following conditions are satisfied:

$$0.02 < D_s/(R22_a - R21_b) < 0.1 \quad (1)$$

$$0.6 < D_a/R21_b < 0.8 \quad (2)$$

where $D_s$ is the length of an air space between the cemented lens component and the positive lens component, $R22_a$ is the radius of curvature of the surface on the object side of the positive lens component, $R21_b$ is the radius of curvature of the surface on the image side of the cemented lens component, and $D_a$ is the distance between the aperture stop and the surface on the image side of the cemented lens component;

wherein the first lens group includes, in order from the object side to the image side, a negative lens whose concave surface faces an image side and a positive lens whose convex surface faces the object side.

19. The varifocal zoom lens according to claim 18:

wherein the second lens group consists only of a cemented lens and a positive biconvex lens disposed on the image side of the cemented lens with an air gap in between the third lens group consist only of a positive lens.

20. A camera system comprising a varifocal zoom lens comprising:

a first lens group having a negative refractive power;

a second lens group having a positive refractive power, consisting of a cemented lens component formed by combining a positive lens element having a convex surface facing to an object side and a negative lens element having a concave surface facing to an image side and a positive lens component disposed on the image side of the cemented lens component, spaced from the cemented lens component by an air space and having a convex surface facing to the object side and disposed on the image side of the first lensgroup; and a third lens group having a positive refractive power and disposed on the image side of the second lens group;

wherein at least the first and the second lens group are moved and the second lens group is moved toward the object side so as to decrease an interval between the first and the second lens group, when a lens state is changing from a shortest-focal-length lens state for the largest field angle to a longest-focal-length lens state for the smallest field angle, an aperture stop is disposed between the first and the second lens group, and the following conditions are satisfied:

$$0.02 < D_s/(R22_a - R21_b) < 0.1 \quad (1)$$

$$0.6 < D_a/R21_b < 0.8 \quad (2)$$

where $D_s$ is the length of an air space between the cemented lens component and the positive lens component, $R22_a$ is the radius of curvature of the surface on the object side of the positive lens component, $R21_b$ is the radius of curvature of the surface on the image side of the cemented lens component, and $D_a$ is the distance between the aperture stop and the surface on the image side of the cemented lens component;

wherein the first lens group includes, in order from the object side to the image side, a negative lens whose concave surface faces an image side and a positive lens whose convex surface faces the object side.

21. The camera system comprising a varifocal zoom lens according to claim 20:

wherein the second lens group consists only of a cemented lens and a positive biconvex lens disposed on the image side of the cemented lens with an air gap in between the third lens group consist only of a positive lens.

* * * * *